United States Patent
Chen et al.

(10) Patent No.: US 11,606,136 B2
(45) Date of Patent: Mar. 14, 2023

(54) SATELLITE, TERMINAL DEVICE, SATELLITE COMMUNICATION SYSTEM, AND SATELLITE COMMUNICATION METHOD

(71) Applicant: HUAWEI TECHNOLOGIES CO., LTD., Guangdong (CN)

(72) Inventors: Jun Chen, Dongguan (CN); Guangjian Wang, Chengdu (CN); Yinggang Du, Shenzhen (CN); Peng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/329,718

(22) Filed: May 25, 2021

(65) Prior Publication Data

US 2021/0281318 A1   Sep. 9, 2021

Related U.S. Application Data

(63) Continuation of application No. PCT/CN2019/090307, filed on Jun. 6, 2019.

(30) Foreign Application Priority Data

Nov. 26, 2018 (CN) .......................... 201811415697.3

(51) Int. Cl.
*H04B 7/185* (2006.01)
*H04W 84/06* (2009.01)

(52) U.S. Cl.
CPC ..... *H04B 7/18513* (2013.01); *H04B 7/18521* (2013.01); *H04B 7/18582* (2013.01); *H04W 84/06* (2013.01)

(58) Field of Classification Search
None
See application file for complete search history.

(56) References Cited

U.S. PATENT DOCUMENTS 8,291,276 B2  10/2012 Hong et al.
8,850,067 B2   9/2014 Ait-Ameur et al.
(Continued)

FOREIGN PATENT DOCUMENTS

CN  101127703 A   2/2008
CN  101552933 A  10/2009
(Continued)

OTHER PUBLICATIONS

Extended European Search Report issued in European Application No. 19888520.4 dated Dec. 9, 2021, 13 pages.
3GPP TS 38.801 V14.0.0 (Mar. 2017), "3rd Generation Partnership Project; Technical Specification Group Radio Access Network; Study on new radio access technology: Radio access architecture and interfaces (Release 14),"Mar. 2017, 91 pages.
(Continued)

*Primary Examiner* — Shirpal K Khajuria
(74) *Attorney, Agent, or Firm* — Fish & Richardson P.C.

(57) ABSTRACT

This application provides an example satellite, an example terminal device, an example satellite communication system, and an example satellite communication method. One example satellite communication method includes obtaining, by a first satellite, at a media access control (MAC) layer, data and/or signaling, where the first satellite is a low orbit satellite. When MAC-layer first processing needs to be performed on the data and/or the signaling, performing, by the first satellite, the MAC-layer first processing on the data and/or the signaling. The MAC-layer first processing includes at least one of hybrid automatic repeat request (HARQ) function processing or random access (RA) function processing.

18 Claims, 11 Drawing Sheets

(56) References Cited

U.S. PATENT DOCUMENTS

| | | | |
|---|---|---|---|
| 2003/0227893 A1 | 12/2003 | Bajic | |
| 2009/0289839 A1 | 11/2009 | McDaniel | |
| 2015/0381267 A1 | 12/2015 | Tronc | |
| 2016/0187489 A1* | 6/2016 | Gurumani | H04B 7/18515 342/357.65 |
| 2017/0230104 A1* | 8/2017 | Purkayastha | H04B 7/2041 |
| 2017/0290034 A1 | 10/2017 | Desai et al. | |
| 2017/0366251 A1* | 12/2017 | Ravishankar | H04B 7/18513 |

FOREIGN PATENT DOCUMENTS

| | | | |
|---|---|---|---|
| CN | 101807952 | A | 8/2010 |
| CN | 102355315 | A | 2/2012 |
| CN | 103004239 | B | 8/2016 |
| CN | 106059654 | A | 10/2016 |
| CN | 106993312 | A | 7/2017 |
| WO | 2008085811 | A2 | 7/2008 |
| WO | 2013041574 | A1 | 3/2013 |
| WO | 2016205765 | A1 | 12/2016 |

OTHER PUBLICATIONS

Ahmadi, "xRAN and C-RAN Integration in M-CORD," Open Neworking Foundation, Xilinx Inc., Nov. 8, 2017, 15 pages.
Arnold et al., "Split Options for 5G Radio Access Networks," 22nd Mobile Communication, Technologies and Applications Conference, May 2017, 14 pages.
Checko et al., "Evaluating C-RAN Fronthaul Functional Splits in Terms of Network Level Energy and Cost Savings," Journal of Communications and Networks, vol. 18, No. 2, Apr. 2016, 12 pages.
Harutyunyan et al., "Flexible Functional Split in 5G Networks," 2017 13th International Conference on Network and Service Management (CNSM), Nov. 2017, 9 pages.
Office Action issued in Chinese Application No. 201811415697.3 dated Sep. 28, 2020, 23 pages (with English translation).
Office Action issued in Chinese Application No. 201811415697.3 dated May 8, 2021, 22 pages (with English translation).
PCT International Search Report and Written Opinion issued in International Application No. PCT/CN2019/090307 dated Sep. 3, 2019, 15 pages (with English translation).

* cited by examiner

SATELLITE, TERMINAL DEVICE, SATELLITE COMMUNICATION SYSTEM, AND SATELLITE COMMUNICATION METHOD

CROSS-REFERENCE TO RELATED APPLICATIONS

This application is a continuation of International Application No. PCT/CN2019/090307, filed on Jun. 6, 2019, which claims priority to Chinese Patent Application No. 201811415697.3, filed on Nov. 26, 2018. The disclosures of the aforementioned applications are hereby incorporated by reference in their entireties.

TECHNICAL FIELD

This application relates to the field of satellite communication, and more specifically, to a satellite, a terminal device, a satellite communication system, and a satellite communication method.

BACKGROUND

For a future evolved new radio (NR) system, which is also referred to as a 5th generation mobile communication (5G) system, a user raises more diversified service type requirements, and also raises a wider service coverage requirement. However, currently, a coverage capability of a mobile communication network that is based on base station coverage is limited, and already cannot meet a requirement of people for obtaining information at any time and at any place. In addition, providing ultra-wide coverage in a mode that is based on base station coverage faces great challenges in terms of costs and feasibility in scenarios such as a remote area, a desert, an ocean, and the air.

Compared with conventional mobile communication, satellite communication has wider coverage and can overcome natural and geographical obstacles such as oceans, deserts, and mountains. In addition, communication costs of the satellite communication are unrelated to a transmission distance. The satellite communication can be used as an effective supplement to the conventional mobile communication, to overcome a shortcoming of the conventional mobile communication.

In a current satellite communication system, all protocol stack processing is completed in a ground station, and a satellite is used only as a relay and forwarding unit. In other words, after receiving data and/or signaling, the satellite directly forwards the data and/or the signaling, or performs only simple demodulation and then forwards the data and/or the signaling. No corresponding protocol stack processing is performed. Therefore, data and/or signaling processing starts only after the data and/or the signaling are/is transmitted from a terminal to the satellite and then to the ground station. This causes a very large delay in an entire data procedure or signaling procedure.

SUMMARY

This application provides a satellite, a terminal device, a satellite communication system, and a satellite communication method, to reduce a delay of processing data and/or signaling by the satellite communication system.

According to a first aspect, a satellite communication method is provided, and includes: A first satellite obtains, at a media access control MAC layer, data and/or signaling, where the first satellite is a low orbit satellite. When MAC-layer first processing needs to be performed on the data and/or the signaling, the first satellite performs the MAC-layer first processing on the data and/or the signaling, where the MAC-layer first processing includes at least one of hybrid automatic repeat request HARQ function processing and random access RA function processing.

According to the satellite communication method in the first aspect, the low orbit satellite obtains, at the MAC layer, the data and/or the signaling, and when the HARQ function processing and/or the RA function processing need/needs to be performed, the first satellite performs the HARQ function processing and/or the RA function processing. In this way, complexity and costs of implementing an on-satellite system of the low orbit satellite are considered, and the HARQ function processing and/or the RA function processing are/is also performed in the low orbit satellite, so that a delay of processing the data and/or the signaling by a satellite communication system can be reduced.

In a possible implementation of the first aspect, an on-satellite system of the first satellite includes a MAC entity and a below-MAC protocol layer entity, and the MAC entity includes a hybrid automatic repeat request HARQ function module and a random access RA function module.

In a possible implementation of the first aspect, for ease of control, the on-satellite system of the first satellite may further include a first MAC control module configured to control a HARQ function and an RA function.

In a possible implementation of the first aspect, the satellite communication method further includes: When ARQ function processing needs to be performed on the data and/or the signaling, the first satellite performs the ARQ function processing on the data and/or the signaling. In this possible implementation, the ARQ function processing is performed in the low-orbit first satellite, so that the delay of the satellite communication system can be further reduced.

In a possible implementation of the first aspect, the on-satellite system of the first satellite may further include an RLC entity, and the RLC entity includes an automatic repeat request ARQ function module.

In a possible implementation of the first aspect, the satellite communication method further includes: When MAC-layer second processing or above-MAC protocol layer processing needs to be performed on the data and/or the signaling, the first satellite sends the data and/or the signaling to a second satellite, where the MAC-layer second processing includes MAC layer function processing other than the HARQ function processing and the RA function processing, and the second satellite is a medium orbit satellite or a high orbit satellite. In this possible implementation, when the MAC layer function processing other than the HARQ function processing and/or the RA function processing needs to be performed, corresponding processing is performed in the medium-orbit or high-orbit second satellite. Alternatively, the second satellite performs the above-MAC protocol layer processing. In this way, complexity and costs of implementing an on-satellite system of the medium orbit satellite or the high orbit satellite are considered, and a part of processing is also performed in the medium orbit satellite or the high orbit satellite, so that the delay of processing the data and/or the signaling by the satellite communication system can be reduced.

It should be understood that a below-MAC protocol layer may include a PHY layer. An above-MAC protocol layer may include one or more of an RLC layer, a PDCP layer, and an SDAP layer. Alternatively, an above-MAC protocol layer may include one or more of an RLC layer, a PDCP layer, and an RRC layer. The above-MAC protocol layer may further include another layer above the MAC layer. This is not limited in this application.

In a possible implementation of the first aspect, that a first satellite obtains, at a MAC layer, data and/or signaling includes: The first satellite receives, at a physical PHY layer, the data and/or the signaling that are/is sent by a terminal device, performs PHY layer processing on the data and/or the signaling, and then sends the data and/or the signaling to the MAC layer. The PHY layer processing may include channel coding, modulation, interleaving, scrambling, rate matching, and the like.

In a possible implementation of the first aspect, the signaling on which the first MAC-layer processing needs to be performed includes random access process signaling and/or HARQ process signaling. In this possible implementation, the random access process signaling and/or the HARQ process signaling that cause/causes a relatively large system delay are/is processed in the low orbit satellite.

In a possible implementation of the first aspect, the signaling on which the above-MAC protocol layer processing needs to be performed includes radio resource control RRC signaling. In this possible implementation, another piece of higher-layer signaling is processed in the medium orbit satellite or the high orbit satellite.

According to a second aspect, a satellite communication method is provided, and includes: A second satellite receives, at a media access control MAC layer or an above-MAC protocol layer, data and/or signaling, where the second satellite is a medium orbit satellite or a high orbit satellite. The second satellite performs, at the MAC layer, MAC-layer second processing on the data and/or the signaling, where the MAC-layer second processing includes MAC layer function processing other than hybrid automatic repeat request HARQ function processing and random access RA function processing; and/or the second satellite performs, at the above-MAC protocol layer, above-MAC protocol layer processing on the data and/or the signaling.

According to the satellite communication method in the second aspect, the medium orbit satellite or the high orbit satellite receives, at the MAC layer or the above-MAC protocol layer, the data and/or the signaling. When the MAC layer function processing other than the HARQ function processing and/or the RA function processing needs to be performed, corresponding processing is performed in the second satellite. Alternatively, the second satellite performs the above-MAC protocol layer processing. In this way, complexity and costs of implementing an on-satellite system of the medium orbit satellite or the high orbit satellite are considered, and a part of processing is also performed in the medium orbit satellite or the high orbit satellite, so that a delay of processing the data and/or the signaling by a satellite communication system can be reduced.

In a possible implementation of the second aspect, an on-satellite system of the second satellite includes a MAC entity and an above-MAC protocol layer entity, and the MAC entity includes another MAC layer function module other than a hybrid automatic repeat request HARQ function module and a random access RA function module.

In a possible implementation of the second aspect, the MAC entity further includes a second MAC control module for another MAC layer function other than a HARQ function and an RA function.

In a possible implementation of the second aspect, the satellite communication method further includes: When ARQ function processing needs to be performed on the data and/or the signaling, the second satellite performs the ARQ function processing on the data and/or the signaling.

In a possible implementation of the second aspect, the on-satellite system of the second satellite further includes an RLC entity, and the RLC entity includes an automatic repeat request ARQ function module.

In a possible implementation of the second aspect, that a second satellite receives, at a MAC layer or an above-MAC protocol layer, data and/or signaling includes: The second satellite receives, at the MAC layer or the above-MAC protocol layer, the data and/or the signaling that are/is sent by a terminal device, where the data and/or the signaling do/does not include a header of a below-MAC-layer protocol layer. In this possible implementation, the data and/or the signaling may include a header of the MAC layer, or may not include a header of the MAC layer, but directly include a header of a higher layer and be transmitted at the higher layer.

In a possible implementation of the second aspect, that a second satellite receives, at a MAC layer or an above-MAC protocol layer, data and/or signaling includes: The second satellite receives, at the MAC layer or the above-MAC protocol layer, data and/or signaling that are/is sent by a first satellite, where the first satellite is a low orbit satellite.

In a possible implementation of the second aspect, the signaling on which the above-MAC protocol layer processing is performed at the above-MAC protocol layer includes radio resource control RRC signaling.

According to a third aspect, a satellite communication method is provided, and includes: A terminal device performs, at a physical PHY layer, transmission of data and/or signaling with a first satellite, where the first satellite is a low orbit satellite. The terminal device performs, at a medium access control MAC layer or an above-MAC protocol layer, transmission of data and/or signaling with a second satellite, where the data and/or the signaling do/does not include a header of a below-MAC-layer protocol layer, and the second satellite is a medium orbit satellite or a high orbit satellite.

According to a fourth aspect, this application provides a satellite, configured to perform the method according to any one of the first aspect or the possible implementations of the first aspect. Specifically, the satellite may include a module configured to perform the method according to any one of the first aspect or the possible implementations of the first aspect.

According to a fifth aspect, this application provides a satellite, configured to perform the method according to any one of the second aspect or the possible implementations of the second aspect. Specifically, the satellite may include a module configured to perform the method according to any one of the second aspect or the possible implementations of the second aspect.

According to a sixth aspect, this application provides a terminal device, configured to perform the method according to any one of the third aspect or the possible implementations of the third aspect. Specifically, the terminal device may include a module configured to perform the method according to any one of the second aspect or the possible implementations of the second aspect.

According to a seventh aspect, this application provides a satellite. The satellite includes a processor and a memory. The memory is configured to store instructions, and the processor is configured to execute the instructions stored in the memory, to enable the satellite to perform the method according to any one of the first aspect or the possible implementations of the first aspect.

According to an eighth aspect, this application provides a satellite. The satellite includes a processor and a memory. The memory is configured to store instructions, and the processor is configured to execute the instructions stored in the memory, to enable the satellite to perform the method according to any one of the second aspect or the possible implementations of the second aspect.

According to a ninth aspect, this application provides a terminal device. The terminal device includes a processor and a memory. The memory is configured to store instructions, and the processor is configured to execute the instructions stored in the memory, to enable the terminal device to perform the method according to any one of the third aspect or the possible implementations of the third aspect.

According to a tenth aspect, this application provides a computer-readable storage medium. The computer-readable storage medium stores instructions, and when the instructions are run on a computer, the computer is enabled to perform the method according to any one of the first aspect and the possible implementations of the first aspect.

According to an eleventh aspect, this application provides a computer-readable storage medium. The computer-readable storage medium stores instructions, and when the instructions are run on a computer, the computer is enabled to perform the method according to any one of the second aspect and the possible implementations of the second aspect.

According to a twelfth aspect, this application provides a computer-readable storage medium. The computer-readable storage medium stores instructions, and when the instructions are run on a computer, the computer is enabled to perform the method according to any one of the third aspect and the possible implementations of the third aspect.

According to a thirteenth aspect, this application provides a computer program product including instructions. When a computer runs the instructions in the computer program product, the computer performs the method according to any one of the first aspect and the possible implementations of the first aspect.

According to a fourteenth aspect, this application provides a computer program product including instructions. When a computer runs the instructions in the computer program product, the computer performs the method according to any one of the second aspect and the possible implementations of the second aspect.

According to a fifteenth aspect, this application provides a computer program product including instructions. When a computer runs the instructions in the computer program product, the computer performs the method according to any one of the third aspect and the possible implementations of the third aspect.

According to a sixteenth aspect, this application provides a computer chip. The computer chip enables a computer to perform the method according to any one of the first aspect and the possible implementations of the first aspect.

According to a seventeenth aspect, this application provides a computer chip. The computer chip enables a computer to perform the method according to any one of the second aspect and the possible implementations of the second aspect.

According to an eighteenth aspect, this application provides a computer chip. The computer chip enables a computer to perform the method according to any one of the third aspect and the possible implementations of the third aspect.

According to a nineteenth aspect, this application provides a satellite communication system, including the satellite according to the fourth aspect or the seventh aspect, the satellite according to the fifth aspect or the eighth aspect, and a ground station.

According to a twentieth aspect, this application provides a satellite communication system, including the satellite according to the fourth aspect or the seventh aspect, and a ground station.

According to a twenty-first aspect, this application provides a satellite communication system, including the satellite according to the fourth aspect or the seventh aspect, the satellite according to the fifth aspect or the eighth aspect, a ground station, and the terminal device according to the sixth aspect or the ninth aspect.

According to a twenty-second aspect, this application provides a satellite communication system, including the satellite according to the fourth aspect or the seventh aspect, a ground station, and the terminal device according to the sixth aspect or the ninth aspect.

According to a twenty-third aspect, this application provides a satellite. The satellite is a first satellite, and is configured to perform the method according to any one of the first aspect and the possible implementations of the first aspect.

According to a twenty-fourth aspect, this application provides a satellite. The satellite is a second satellite, and is configured to perform the method according to any one of the second aspect and the possible implementations of the second aspect.

According to a twenty-fifth aspect, this application provides a terminal device, configured to perform the method according to any one of the third aspect and the possible implementations of the third aspect.

According to a twenty-sixth aspect, this application provides a satellite communication system, including the satellite according to the twenty-third aspect, the satellite according to the twenty-fourth aspect, and a ground station.

According to a twenty-seventh aspect, this application provides a satellite communication system, including the satellite according to the twenty-third aspect, the satellite according to the twenty-fourth aspect, a ground station, and the terminal device according to the twenty-fifth aspect.

According to a twenty-eighth aspect, this application provides a satellite communication system, including the satellite according to the twenty-third aspect, and a ground station.

According to a twenty-ninth aspect, this application provides a satellite communication system, including the satellite according to the twenty-third aspect, a ground station, and the terminal device according to the twenty-fifth aspect.

According to a thirtieth aspect, this application provides a satellite. The satellite is a first satellite, and includes a processor, configured to execute a program in a memory to implement the method according to any one of the first aspect and the possible implementations of the first aspect.

According to a thirty-first aspect, this application provides a satellite. The satellite is a second satellite, and includes a processor, configured to execute a program in a memory to implement the method according to any one of the second aspect and the possible implementations of the second aspect.

According to a thirty-second aspect, this application provides a terminal device, including a processor, configured to execute a program in a memory to implement the method according to any one of the third aspect and the possible implementations of the third aspect.

According to a thirty-third aspect, this application provides a satellite communication system, including the satellite according to the thirtieth aspect, the satellite according to the thirty-first aspect, and a ground station.

According to a thirty-fourth aspect, this application provides a satellite communication system, including the satellite according to the thirtieth aspect, the satellite according to the thirty-first aspect, a ground station, and the terminal device according to the thirty-second aspect.

According to a thirty-fifth aspect, this application provides a satellite communication system, including the satellite according to the thirtieth aspect, and a ground station.

According to a thirty-sixth aspect, this application provides a satellite communication system, including the satellite according to the thirtieth aspect, a ground station, and the terminal device according to the thirty-second aspect.

According to a thirty-seventh aspect, this application provides a satellite. The satellite is a first satellite, and includes a processor. The processor is coupled to a memory. The memory is configured to store a computer program. The processor is configured to execute the computer program stored in the memory, to enable the first satellite to perform the method according to any one of the first aspect and the possible implementations of the first aspect.

According to a thirty-eighth aspect, this application provides a satellite. The satellite is a second satellite, and includes a processor. The processor is coupled to a memory. The memory is configured to store a computer program. The processor is configured to execute the computer program stored in the memory, to enable the second satellite to perform the method according to any one of the second aspect and the possible implementations of the second aspect.

According to a thirty-ninth aspect, this application provides a terminal device, including a processor. The processor is coupled to a memory. The memory is configured to store a computer program. The processor is configured to execute the computer program stored in the memory, to enable the terminal device to perform the method according to any one of the third aspect and the possible implementations of the third aspect.

According to a fortieth aspect, this application provides a satellite communication system, including the satellite according to the thirty-seventh aspect, the satellite according to the thirty-eighth aspect, and a ground station.

According to a forty-first aspect, this application provides a satellite communication system, including the satellite according to the thirty-seventh aspect, the satellite according to the thirty-eighth aspect, a ground station, and the terminal device according to the thirty-ninth aspect.

According to a forty-second aspect, this application provides a satellite communication system, including the satellite according to the thirty-seventh aspect, and a ground station.

According to a forty-third aspect, this application provides a satellite communication system, including the satellite according to the thirty-seventh aspect, a ground station, and the terminal device according to the thirty-ninth aspect.

According to a forty-fourth aspect, this application provides a satellite. The satellite is a first satellite, and includes a processor and a transceiver. The processor is configured to execute a computer program stored in a memory, to enable the first satellite to perform the method according to any one of the first aspect and the possible implementations of the first aspect.

According to a forty-fifth aspect, this application provides a satellite. The satellite is a second satellite, and includes a processor and a transceiver. The processor is configured to execute a computer program stored in a memory, to enable the second satellite to perform the method according to any one of the second aspect and the possible implementations of the second aspect.

According to a forty-sixth aspect, this application provides a terminal device, including a processor and a transceiver. The processor is configured to execute a computer program stored in a memory, to enable the terminal device to perform the method according to any one of the third aspect and the possible implementations of the third aspect.

According to a forty-seventh aspect, this application provides a satellite communication system, including the satellite according to the forty-fourth aspect, the satellite according to the forty-fifth aspect, and a ground station.

According to a forty-eighth aspect, this application provides a satellite communication system, including the satellite according to the forty-fourth aspect, the satellite according to the forty-fifth aspect, a ground station, and the terminal device according to the forty-sixth aspect.

According to a forty-ninth aspect, this application provides a satellite communication system, including the satellite according to the forty-fourth aspect, and a ground station.

According to a fiftieth aspect, this application provides a satellite communication system, including the satellite according to the forty-fourth aspect, a ground station, and the terminal device according to the forty-sixth aspect.

According to a fifty-first aspect, this application provides a satellite. The satellite is a first satellite, and includes a processor, a memory, and a transceiver. The memory is configured to store a computer program. The processor is configured to execute the computer program stored in the memory, to enable the first satellite to perform the method according to any one of the first aspect and the possible implementations of the first aspect.

According to a fifty-second aspect, this application provides a satellite. The satellite is a second satellite, and includes a processor, a memory, and a transceiver. The memory is configured to store a computer program. The processor is configured to execute the computer program stored in the memory, to enable the second satellite to perform the method according to any one of the second aspect and the possible implementations of the second aspect.

According to a fifty-third aspect, this application provides a terminal device, including a processor, a memory, and a transceiver. The memory is configured to store a computer program. The processor is configured to execute the computer program stored in the memory, to enable the terminal device to perform the method according to any one of the third aspect and the possible implementations of the third aspect.

According to a fifty-fourth aspect, this application provides a satellite communication system, including the satellite according to the fiftieth aspect, the satellite according to the fifty-first aspect, and a ground station.

According to a fifty-fifth aspect, this application provides a satellite communication system, including the satellite according to the fiftieth aspect, the satellite according to the fifty-first aspect, a ground station, and the terminal device according to the fifty-second aspect.

According to a fifty-sixth aspect, this application provides a satellite communication system, including the satellite according to the fiftieth aspect, and a ground station.

According to a fifty-seventh aspect, this application provides a satellite communication system, including the satellite according to the fiftieth aspect, a ground station, and the terminal device according to the fifty-second aspect.

According to a fifty-eighth aspect, this application provides a satellite, including a unit or a means for performing each step according to any one of the first aspect and the possible implementations of the first aspect.

According to a fifty-ninth aspect, this application provides a satellite, including a unit or a means for performing each step according to any one of the second aspect and the possible implementations of the second aspect.

According to a sixtieth aspect, this application provides a terminal device, including a unit or a means for performing each step according to any one of the third aspect and the possible implementations of the third aspect.

According to a sixty-first aspect, this application provides a satellite communication system, including the satellite according to the fifty-sixth aspect, the satellite according to the fifty-seventh aspect, and a ground station.

According to a sixty-second aspect, this application provides a satellite communication system, including the satellite according to the fifty-sixth aspect, the satellite according to the fifty-seventh aspect, a ground station, and the terminal device according to the fifty-eighth aspect.

According to a sixty-third aspect, this application provides a satellite communication system, including the satellite according to the fifty-sixth aspect, and a ground station.

According to a sixty-fourth aspect, this application provides a satellite communication system, including the satellite according to the fifty-sixth aspect, a ground station, and the terminal device according to the fifty-eighth aspect.

According to a sixty-fifth aspect, this application provides a processor. The processor includes at least one circuit, configured to perform the method according to any one of the first aspect and the possible implementations of the first aspect, any one of the second aspect and the possible implementations of the second aspect, or any one of the third aspect and the possible implementations of the third aspect.

DESCRIPTION OF EMBODIMENTS

Figure 1:
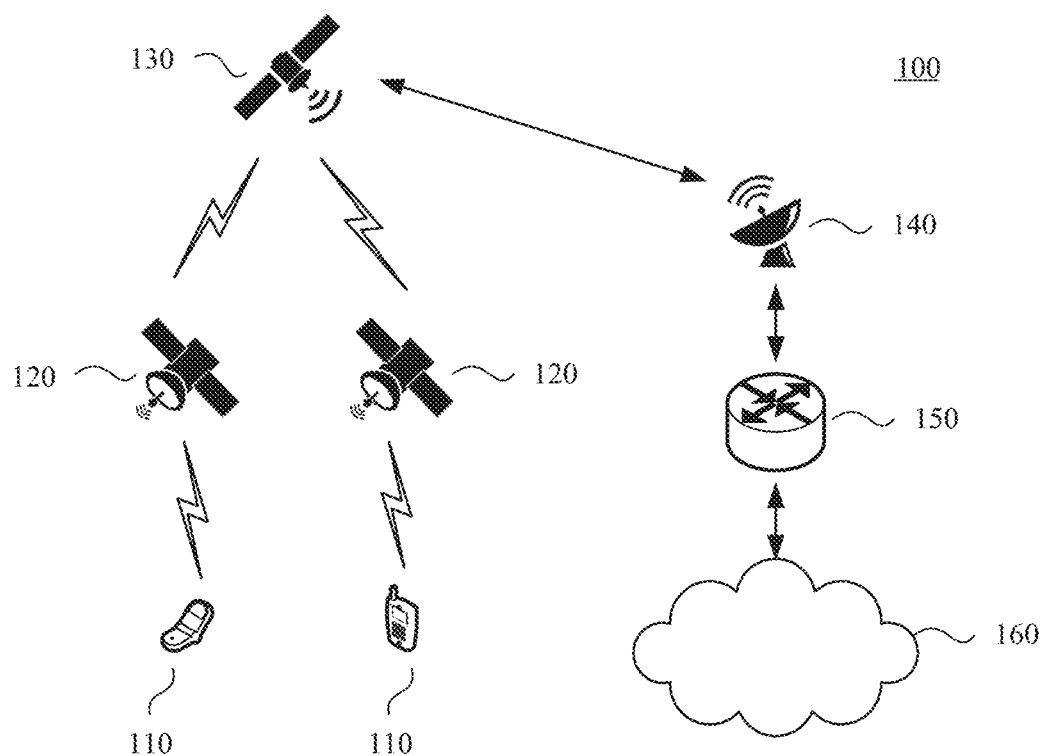
FIG. 1 is a schematic diagram of a scenario of a multi-layer satellite communication architecture.

The following describes technical solutions in this application with reference to the accompanying drawings.

First, a satellite communication system is briefly described. The satellite communication system usually includes a satellite and a ground station. Based on different orbital altitudes, satellites may be classified into the following three types: a geostationary earth orbit (GEO) satellite, also referred to as a synchronous orbit satellite or a high orbit satellite; a medium earth orbit (MEO) satellite, also referred to as a medium orbit satellite; and a low earth orbit (LEO) satellite, also referred to as a low orbit satellite.

An orbital altitude of the GEO satellite is 35,786 km. Main advantages of the GEO satellite are being stationary relative to the ground and providing very large coverage. However, disadvantages of the GEO satellite are also relatively prominent. For example, a distance from the ground is excessively large and an antenna with a relatively large diameter is needed; a transmission delay is relatively large, being about 0.5 second, and cannot meet a requirement of a real-time service; obit resources are relatively in shortage, launch costs are high, and coverage cannot be provided for the bipolar regions.

An orbital altitude of the MEO satellite ranges from 2.000 km to 35,786 km. Global coverage can be achieved by using a relatively small quantity of MEO satellites. The MEO satellite has a larger transmission delay than the LEO satellite. Currently, the MEO satellite is mainly used for positioning and navigation.

An orbital altitude of the LEO satellite ranges from 300 km to 2,000 km. Compared with the MEO satellite and the GEO satellite, the LEO satellite has a lower orbital altitude, a smaller data transmission delay, a smaller power loss, and lower launch costs. Therefore, a communication network that is based on the LEO satellite has greatly progressed in recent years. The LEO satellite is used as an information access point, and a capability of the satellite to cover a wider area than a base station is fully utilized, to achieve efficient coverage of the air, an ocean, and a remote area. In addition, the LEO satellite may be integrated with a long term evolution (LTE) network or a 5G (NR) network, to provide wider coverage and better user experience for a user under the premise of using a same terminal device.

In a communication scenario in which a satellite communication system is integrated with a ground mobile communication system, it is required that a common terminal device may be used to access the satellite communication system.

Therefore, protocol stack integration needs to be performed between the satellite communication system and the ground mobile communication system. A relatively simple implementation is that a complete protocol stack of an LTE system/NR system is included in the satellite communication system. On the premise of no new network element being introduced, in the current satellite communication system, all protocol stack processing is completed in a ground station, and a satellite is used only as a relay and forwarding unit. However, the following disadvantage is consequently caused: Data and/or signaling processing starts only after the data and/or the signaling are/is transmitted from a terminal to the satellite and then to the ground station. This causes a very large delay in an entire data procedure or signaling procedure.

With respect to protocol stack deployment, protocol stack division exists in the ground mobile communication system, for example, an existing LTE system or a next-generation NR system. A typical scenario is protocol stack division of a central unit (central unit, CU)-distributed unit (DU) in a cloud radio access network (CRAN) architecture. A manner of the protocol stack division of the CU-DU is relatively flexible, and division may be randomly performed at a physical layer (PHY), a media access control (MAC) layer, and the like.

However, for an on-satellite system of a satellite, factors such as a transmission capacity of a feed link, a delay, and a power loss of a satellite-ground link need to be comprehensively considered, and costs, a volume, a mechanics of machinery effect, and the like of the satellite also need to be considered. In addition, an architecture of the satellite communication system is relatively complex and is further divided into a multi-layer satellite communication architecture and a single-layer satellite communication architecture. Therefore, the protocol stack division of the ground mobile communication system cannot be simply transplanted to protocol stack division of a satellite communication system.

Next, the multi-layer satellite communication architecture and the single-layer satellite communication architecture are separately briefly described.

FIG. 1 is a schematic diagram of a scenario of a multi-layer satellite communication architecture 100. As shown in FIG. 1, the multi-layer satellite communication architecture 100 has multi-layer satellite coverage. A two-layer satellite communication system is used as an example. A first-layer satellite 120 close to a terminal device 110 is a low orbit satellite, and a second-layer satellite 130 above the first-layer satellite 120 is a medium orbit satellite or a high orbit satellite. For uplink transmission, the terminal device 110 sends data or signaling to the first-layer satellite 120, and then the first-layer satellite 120 forwards the data to the second-layer satellite 130. The second-layer satellite 130 forwards the data or signaling to a ground station 140. The ground station 140 then routes the data or signaling to the internet 160 through a routing device 150.

Figure 2:
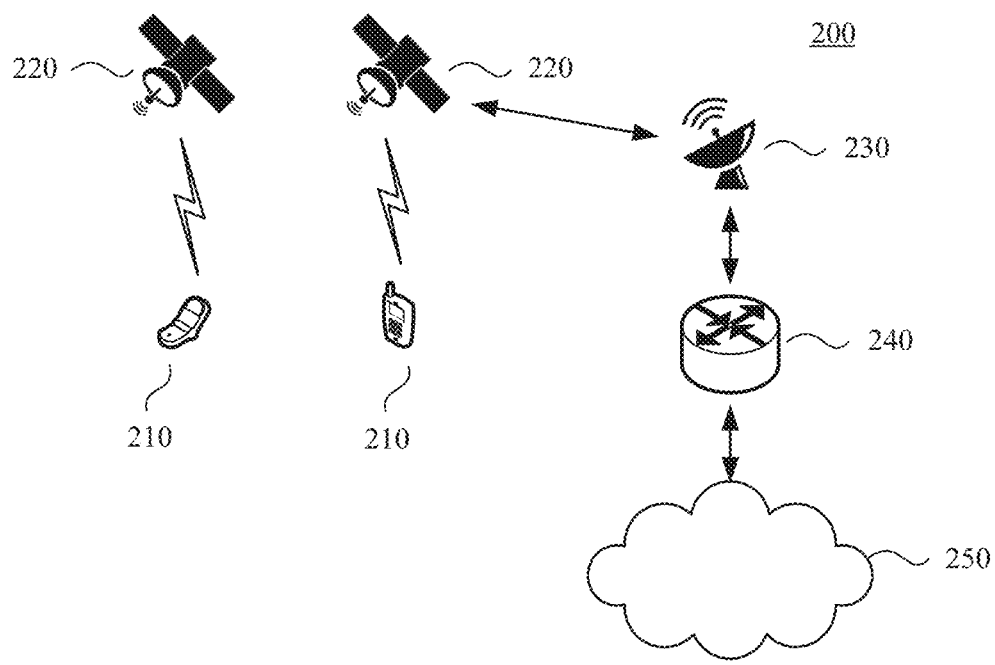
FIG. 2 is a schematic diagram of a scenario of a single-layer satellite communication architecture.

FIG. 2 is a schematic diagram of a scenario of a single-layer satellite communication architecture 200. As shown in FIG. 2, only a single-layer satellite exists in the single-layer satellite communication architecture 200. Considering a delay requirement of a user and a limitation on transmit power of a terminal device, a scenario of a low orbit satellite is more considered when the single-layer satellite is used for coverage. For uplink transmission, the terminal device 210 sends data or signaling to a low orbit satellite 220. The low orbit satellite 220 forwards the data or signaling to a ground station 230. The ground station 230 then routes the data or signaling to the internet 250 through a routing device 240.

Regardless of a low orbit satellite, a medium orbit satellite, or a high orbit satellite, to ensure that a user can access a network through a terminal device that is uniform with that on the ground, the satellite needs to support a protocol stack compatible with an existing LTE system or NR system.

Next, a protocol stack, also referred to as a protocol framework, is briefly described.

In an existing protocol framework, transmission of any data or signaling needs to depend on support of a protocol of each layer.

Figure 3:
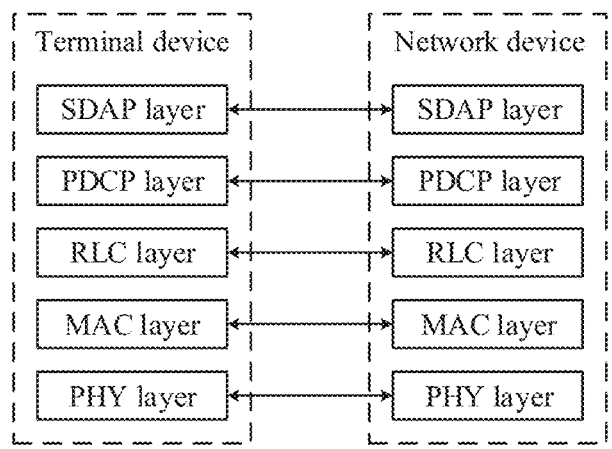
FIG. 3 is a schematic diagram of a protocol stack of a data plane in a mobile communication network.

FIG. 3 is a schematic diagram of a protocol stack of a data plane in a mobile communication network. Based on the protocol stack shown in FIG. 3, in a data transmission process, for example, in an uplink transmission process, a terminal device first maps a quality of service (QoS) data stream to a radio bearer through a service data adaptation protocol (SDAP) layer, and then sends the data stream to a packet data convergence protocol (PDCP) layer. The PDCP layer performs header compression and encryption on data, and then sends the data to a radio link control (RLC) layer. The RLC layer performs blocking and concatenation on the data, and then sends the data to a MAC layer. The MAC layer performs multiplexing and transport format combination on a current data packet, selects an appropriate transport format, and sends the data packet to a PHY layer. Finally, the PHY layer selects a transport format combination to modulate and encode the data packet, and then sends the data packet to a network device. The network device performs demodulation, decoding, de-multiplexing, data reassembling, decompression, and decryption, sequentially through the PHY layer, the MAC layer, the RLC layer, the PDCP layer, and the SDAP layer, and then demaps the QoS data stream from the radio bearer, to obtain data sent by the terminal device.

Figure 4:
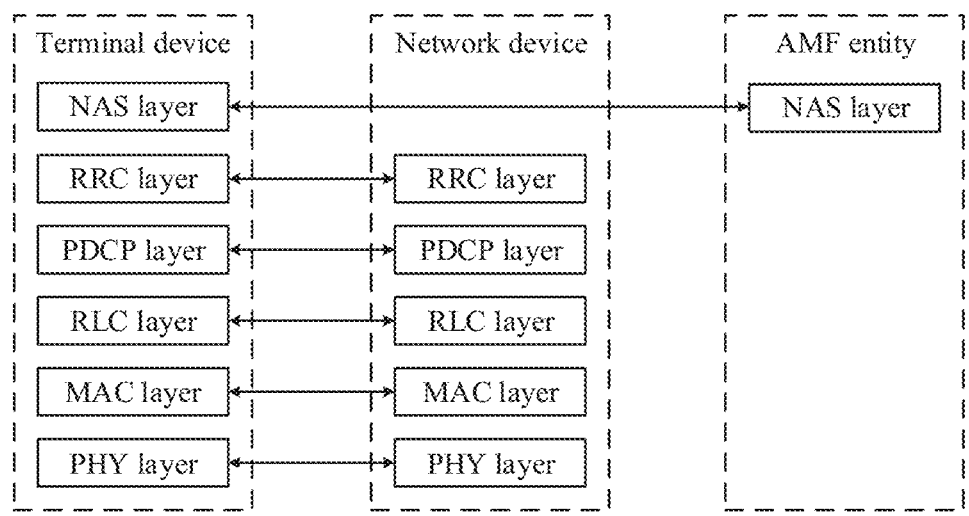
FIG. 4 is a schematic diagram of a protocol stack of a control plane in a mobile communication network.

FIG. 4 is a schematic diagram of a protocol stack of a control plane in a mobile communication network. Based on the protocol stack shown in FIG. 4, in a signaling transmission process, a terminal device performs, on signaling, processing, such as encapsulation, encryption and integrity protection, blocking and concatenation, multiplexing, and selection of an appropriate transport format, sequentially through a radio resource control (RRC) layer, a PDCP layer, an RLC layer, a MAC layer, and a PHY layer. Finally, the terminal device modulates and encodes the signaling in a selected transport format, and sends the signaling to a network device. The network device performs demodulation, decoding, de-multiplexing, data reassembling, decryption, verification, and decapsulation, sequentially through the PHY layer, the MAC layer, the RLC layer, the PDCP layer, and the RRC layer, to obtain the signaling sent by the terminal device. Then, the network device performs corresponding processing based on the signaling. A protocol stack of the terminal device may further include a non-access stratum (NAS). The NAS layer is not located on a network device of an access network, but is located on an access and mobility management function (AMF) entity of a core network.

The network device may be a base station. The base station may be configured to communicate with one or more terminals, or may be configured to perform communication with one or more base stations that have some terminal functions (for example, communication between a macro base station and a micro base station such as an access point). The base station may be an evolved NodeB (eNB) in an LTE system, or a base station (such as a gNB) in a 5G system or an NR system. In addition, the base station may alternatively be an access point (AP), a transmission reception point (TRP), a CU, or another network entity, and may include some or all of functions of the foregoing network entities.

Terminal devices may be distributed across an entire wireless communication system, and may be stationary or mobile. In some embodiments of this application, the terminal device may be a mobile device, a mobile station, a mobile unit, a machine-to-machine (M2M) terminal, a radio unit, a remote unit, a user agent, a mobile client, user equipment (UE), or the like.

Finally, a delay generated on a data plane and a delay generated on a control plane are briefly described.

In this application, a control plane delay in the LTE system may be approximately defined as a time for switching from an idle state to an active state by the terminal device. A delay in an initial access process is tested based on an actual LTE system. The initial access process includes processes such as random access (RA), RRC connection, initialization, and broadcasting. A test result shows that a delay caused by the RA process is a main part of the control plane delay, and even accounts for about 70% of a total delay of the control plane and the data plane. An RA function is located at a MAC layer.

Figure 5:
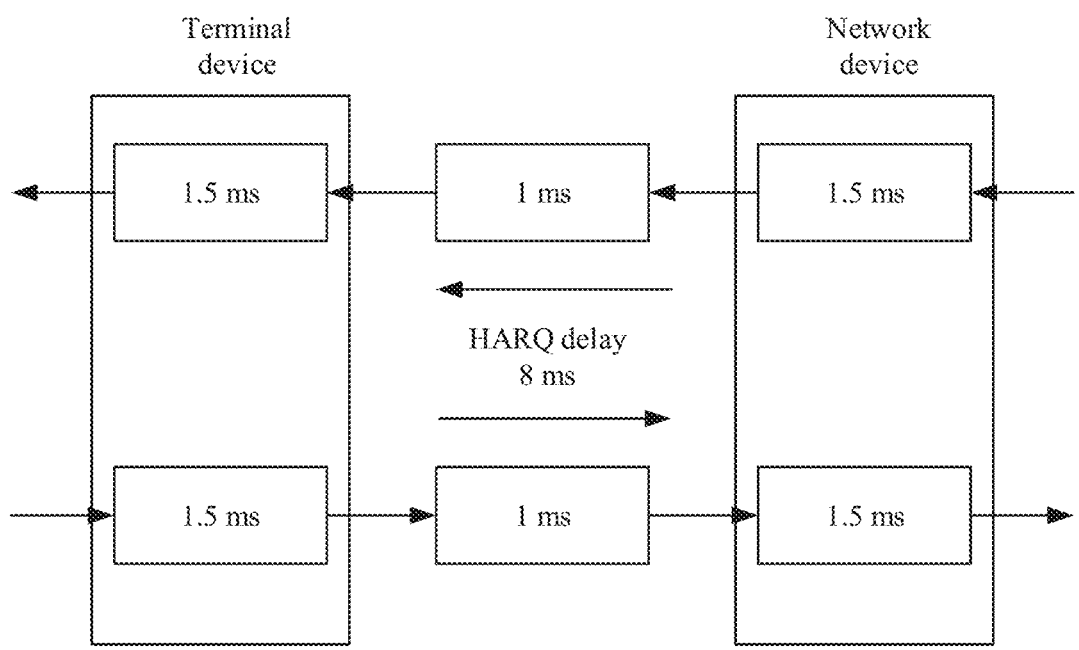
FIG. 5 is a schematic diagram of a data plane delay in an LTE system.

The data plane is also referred to as a user plane. In this application, a data plane delay may be approximately defined as a time for transmission of an inter-network internet protocol (IP) data packet from an IP layer (which, in the NR system, corresponds to a protocol layer connected to an SDAP layer, and is above the SDAP layer; in the LTE system, corresponds to a protocol layer connected to a PDCP layer, and is above the PDCP layer) of the terminal device/base station to the base station/terminal device. FIG. 5 is a schematic diagram of a data plane delay in an LTE system. As shown in FIG. 5, for a unidirectional uplink or downlink transmission delay, a formula for calculating a data plane delay is as follows:

$$t_{UP}=1.5+1+1.5+n*8=8n+4 \qquad (1)$$

In the formula, the first item is a processing delay 1.5 ms of a terminal device, the second item is duration (for example, 1 ms), of one subframe, specified in a protocol, the third item is a processing delay 1.5 ms of a network device, and the last item is a hybrid automatic repeat request (HARQ) delay of the terminal device. In an LTE system, a maximum quantity of HARQ times is specified as 8, and n is the transmission delay. It can be learned from the formula (1) that, for a satellite communication system, even if a satellite is a low orbit satellite, a transmission time is 2 ms or longer. If data retransmission occurs, the data plane delay is mainly the HARQ delay. If a scenario of a high orbit satellite is considered, when an altitude of the satellite is 35,786 km, it may be calculated that a round-trip transmission delay of the satellite is about 238 ms. If retransmission occurs for a plurality of times, the transmission delay becomes a bottleneck of the system. A protocol of an existing LTE system/NR system specifies that, to ensure reliability of data transmission, a data transmission mode that is based on HARQ/automatic repeat request (ARQ) is used. A plurality of times of repeated retransmission causes a larger system delay. A HARQ function is located at a MAC layer, and an ARQ function is located at an RLC layer. To shorten a system delay, factors described above are comprehensively considered. In this application, division is considered to be performed based on functions related to the MAC layer and the RLC layer in a protocol stack of the satellite communication system.

Figure 6:
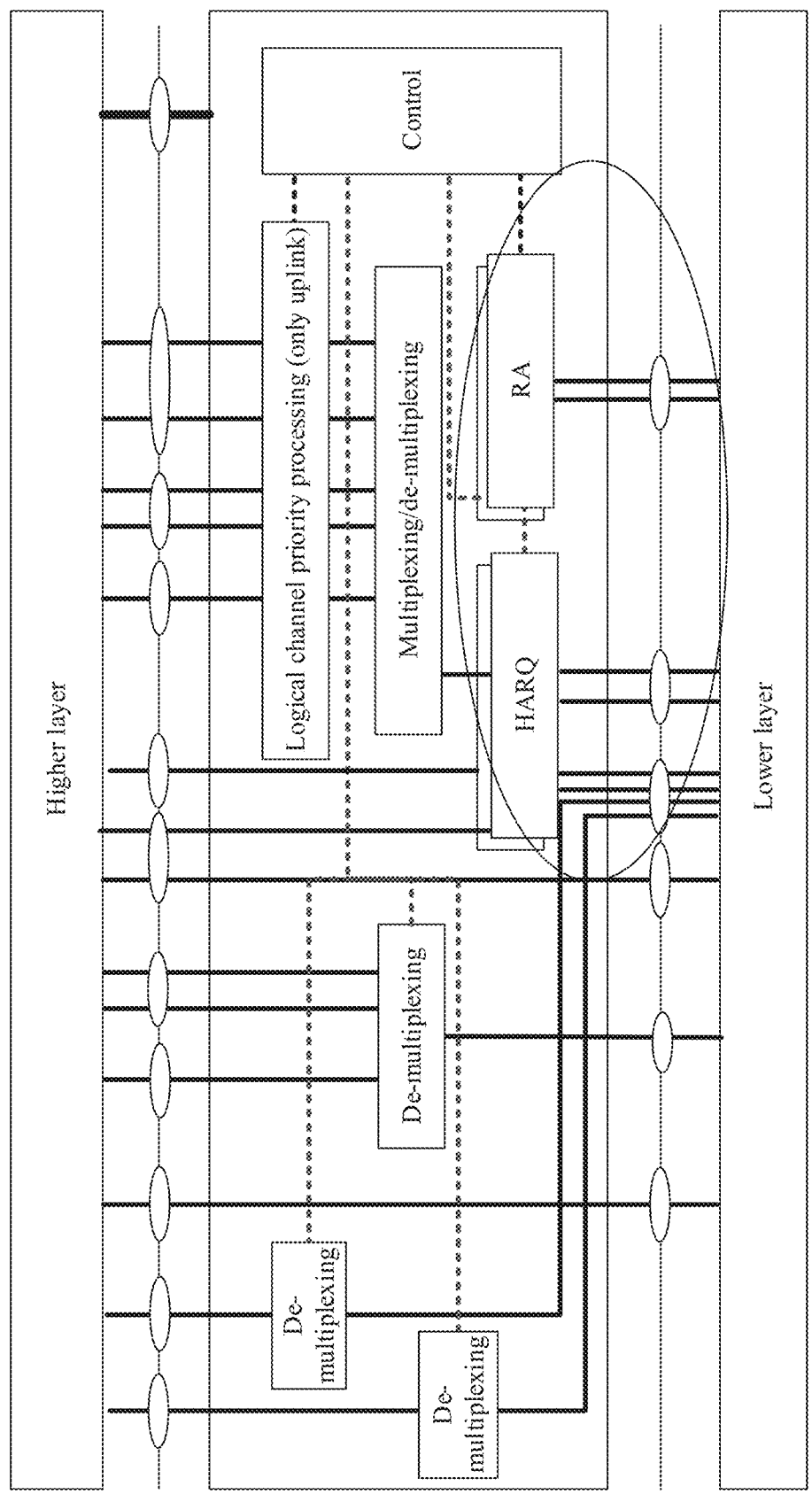
FIG. 6 is a schematic diagram of functions and function division of a MAC layer according to an embodiment of this application.
Figure 7:
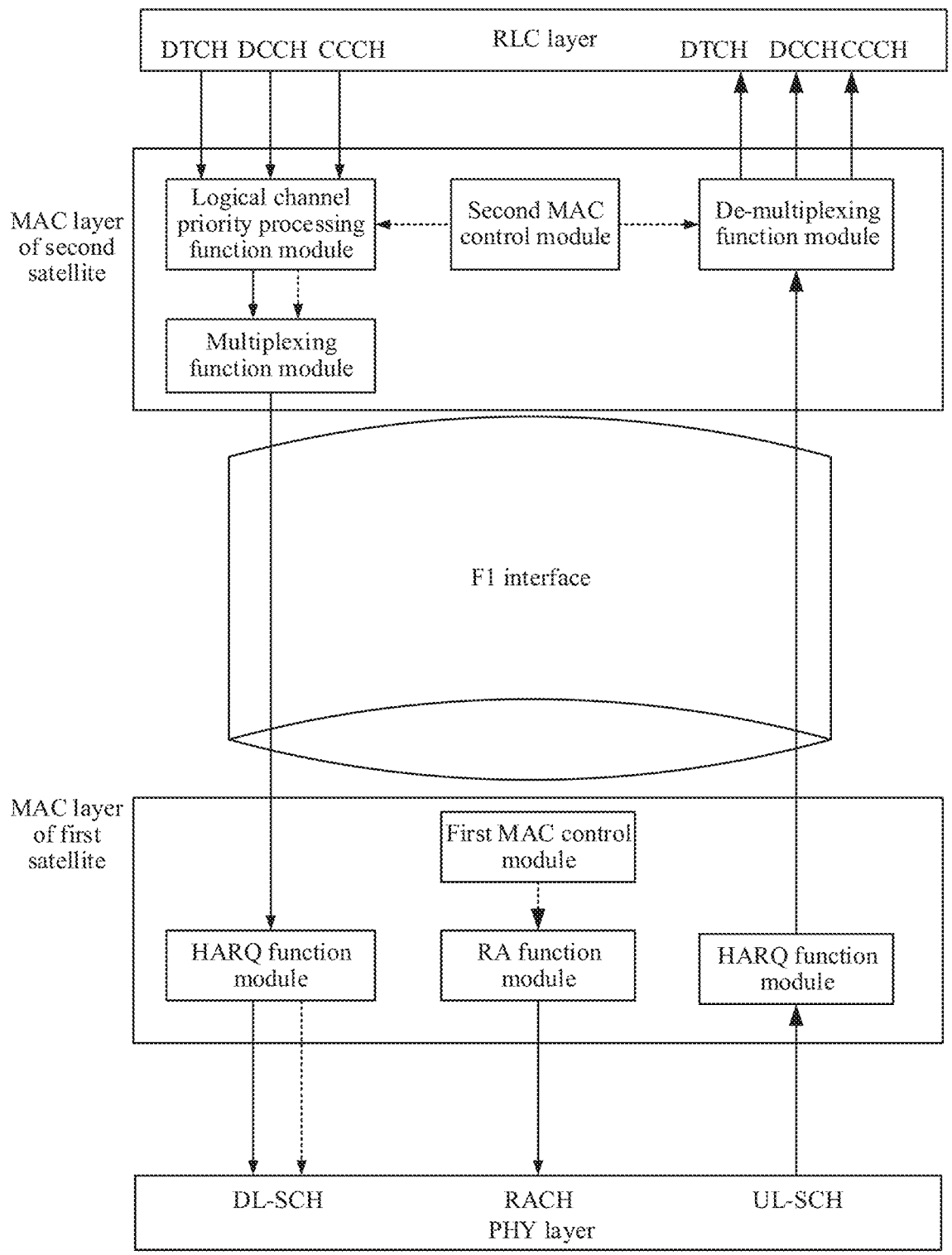
FIG. 7 is a schematic diagram of protocol stack deployment in a multi-layer satellite communication architecture according to an embodiment of this application.

With reference to FIG. 6 and FIG. 7, protocol stack deployment in a multi-layer satellite communication architecture is described in detail.

FIG. 6 is a schematic diagram of functions and function division of a MAC layer according to an embodiment of this application. A protocol of an existing LTE system/NR system specifies that, main functions of the MAC layer include: mapping between a logical channel and a transport channel, scheduling, multiplexing, de-multiplexing, logical channel priority processing, HARQ, RA, and the like.

In some embodiments of this application, an on-satellite system of a low orbit satellite at a low layer in the multi-layer satellite communication architecture includes a MAC entity and a below-MAC protocol layer entity, and the MAC entity includes a HARQ function module and an RA function module. An on-satellite system of a satellite (a medium orbit satellite or a high orbit satellite) at a high layer in the multi-layer satellite communication architecture includes a MAC entity and an above-MAC protocol layer entity, and the MAC entity includes another function module that is at the MAC layer and that is other than a HARQ function module and an RA function module, for example, a multiplexing function module, a de-multiplexing function module, or a logical channel priority processing function module. Therefore, protocol stack deployment of a satellite at a low layer and protocol stack deployment of a satellite at a high layer form a complete protocol stack relative to a terminal device.

It should be understood that the MAC entity, the below-MAC protocol layer entity, and the above-MAC protocol layer entity are entities that are based on functions.

In this specification, for a two-layer satellite communication architecture, a low orbit satellite at a low layer may be referred to as a first satellite, and a medium orbit satellite or a high orbit satellite at a high layer may be referred to as a second satellite.

It should be understood that a below-MAC protocol layer may include a PHY layer. An above-MAC protocol layer may include one or more of an RLC layer, a PDCP layer, and an SDAP layer. Alternatively, an above-MAC protocol layer may include one or more of an RLC layer, a PDCP layer, and an RRC layer. The above-MAC protocol layer may further include another layer above the MAC layer. This is not limited in this application.

FIG. 7 is a schematic diagram of protocol stack deployment in a multi-layer satellite communication architecture according to an embodiment of this application.

Optionally, as shown in FIG. 7, an on-satellite system of a first satellite may further include a first MAC control module configured to control a HARQ function and an RA function. The first MAC control module may include a cell radio network temporary identifier (C-RNTI) module, a time alignment command (TA command) module, and the like. Certainly, the first MAC control module may be deployed in an on-satellite system of a second satellite. This is not limited in this embodiment of this application.

Optionally, as shown in FIG. 7, the on-satellite system of the second satellite may further include a second MAC control module configured to control another MAC layer function other than the HARQ function and the RA function. The second MAC control module may include a control module configured to control functions such as a multiplexing function, a de-multiplexing function, and a logical channel priority processing function.

In this embodiment of this application, a HARQ function module at a MAC layer of the first satellite may separately communicate with a downlink shared channel (DL-SCH)

and an uplink shared channel (UL-SCH) of a PHY layer of the first satellite. An RA function module at the MAC layer of the first satellite may communicate with a random access channel (RACH) of the PHY layer of the first satellite.

A logical channel priority processing function module at a MAC layer of the second satellite may separately communicate with a dedicated traffic channel (dedicated traffic channel, DTCH), a dedicated control channel (DCCH), and a common control channel (CCCH) of an RLC layer of the second satellite. A de-multiplexing function module at the MAC layer of the second satellite may also separately communicate with the DTCH, the DCCH, and the CCCH of the RLC layer of the second satellite.

Optionally, a protocol of an existing LTE system/NR system specifies that a CU exchanges information with a CU through an Xn interface, and a CU exchanges information with a DU through an F1 interface. In a satellite communication system in this application, to keep protocol compatibility with a ground mobile communication system, similarly, an interface between second satellites may be referred to as Xn, and an interface between a first satellite and a second satellite may be referred to as F1. However, this is not limited in this application.

Figure 8:
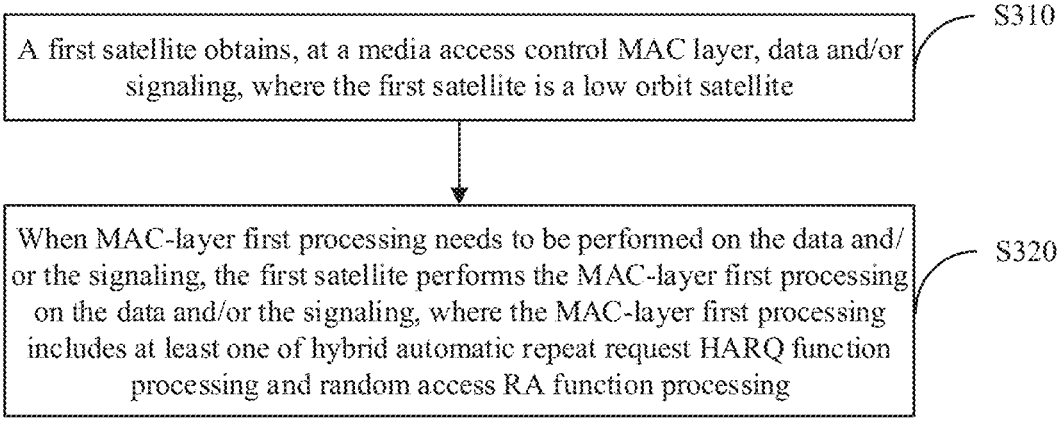
FIG. 8 is a schematic flowchart of a satellite communication method according to an embodiment of this application.

Based on the protocol stack deployment in the multi-layer satellite communication architecture described in FIG. 6 and FIG. 7, this application provides a satellite communication method. FIG. 8 is a schematic flowchart of a satellite communication method 300 according to an embodiment of this application. As shown in FIG. 8, the satellite communication method 300 includes the following steps: S310: A first satellite obtains, at a media access control MAC layer, data and/or signaling, where the first satellite is a low orbit satellite. S320: When MAC-layer first processing needs to be performed on the data and/or the signaling, the first satellite performs the MAC-layer first processing on the data and/or the signaling, where the MAC-layer first processing includes at least one of hybrid automatic repeat request HARQ function processing and random access RA function processing.

According to the satellite communication method in this embodiment of this application, the low orbit satellite obtains, at the MAC layer, the data and/or the signaling, and when the HARQ function processing and/or the RA function processing need/needs to be performed, the first satellite performs the HARQ function processing and/or the RA function processing. In this way, complexity and costs of implementing an on-satellite system of the low orbit satellite are considered, and the HARQ function processing and/or the RA function processing are/is also performed in the low orbit satellite, so that a delay of processing the data and/or the signaling by a satellite communication system can be reduced.

The HARQ function processing and the RA function processing are performed in the low orbit satellite, to avoid that the data and/or the signaling are/is forwarded between satellites and then forwarded by the satellite to a ground station before being processed, so that the delay of processing the data and/or the signaling by the satellite communication system can be reduced.

Optionally, in some embodiments, the satellite communication method 300 may further include: When MAC-layer second processing or above-MAC protocol layer processing needs to be performed on the data and/or the signaling, the first satellite sends the data and/or the signaling to a second satellite, where the MAC-layer second processing includes MAC layer function processing other than the HARQ function processing and the RA function processing, and the second satellite is a medium orbit satellite or a high orbit satellite. In other words, an orbital altitude of the second satellite is higher than an orbital altitude of the first satellite.

It should be further understood that, that the first satellite sends the data and/or the signaling to a second satellite may be that the first satellite sends, at the MAC layer, the data and/or the signaling to a MAC layer of the second satellite.

When the HARQ function processing and/or the RA function processing do/does not need to, but the MAC layer function processing (the MAC-layer second processing) other than the HARQ function processing and the RA function processing needs to or the above-MAC protocol layer processing needs to be performed on the data and/or the signaling, after obtaining the data and/or the signaling, the first satellite forwards the data and/or the signaling to the second satellite with a higher orbital altitude, so that the second satellite performs the other MAC layer function processing, and if necessary, performs the above-MAC protocol layer processing.

Optionally, in some embodiments, that a first satellite obtains, at a MAC layer, data and/or signaling in S310 may include: The first satellite receives, at a physical PHY layer, the data and/or the signaling sent by a terminal device, performs PHY layer processing on the data and/or the signaling, and then sends the data and/or the signaling to the MAC layer.

Because some function modules of the PHY layer and the MAC layer are deployed in the on-satellite system of the first satellite, the first satellite may receive, at the PHY layer, the data and/or the signaling sent by the terminal device, performs corresponding PHY layer processing on the data and/or the signaling, sends the data and/or the signaling to the MAC layer, performs a portion of MAC layer processing on the data and/or the signaling, and then sends the data and/or the signaling to the MAC layer of the second satellite. The PHY layer processing may include channel coding, modulation, interleaving, scrambling, rate matching, and the like.

Figure 9:
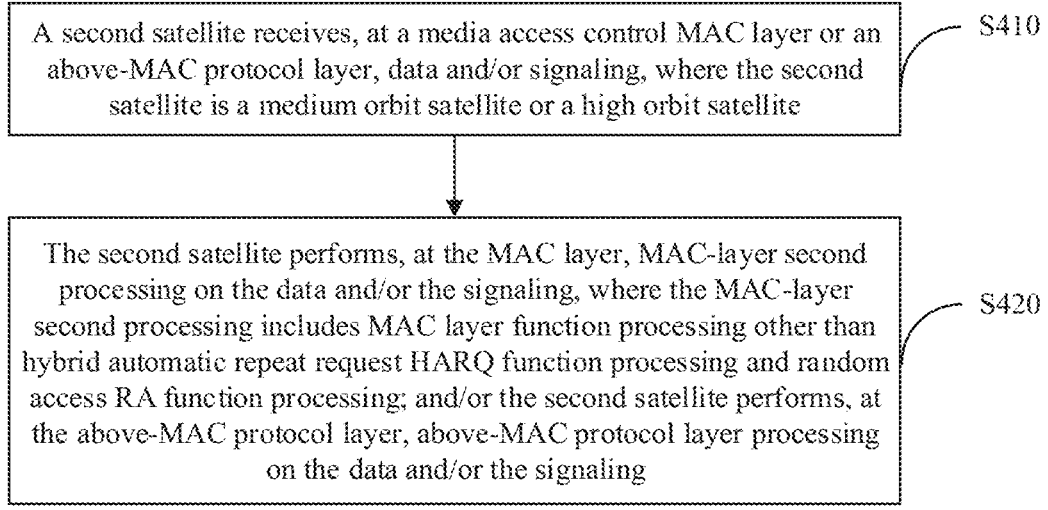
FIG. 9 is a schematic flowchart of a satellite communication method according to another embodiment of this application.

Correspondingly, for a medium orbit satellite or a high orbit satellite, FIG. 9 is a schematic flowchart of a satellite communication method 400 according to another embodiment of this application. As shown in FIG. 9, the satellite communication method 400 includes the following steps: S410: A second satellite receives, at a media access control MAC layer or an above-MAC protocol layer, data and/or signaling, where the second satellite is a medium orbit satellite or a high orbit satellite. S420: The second satellite performs, at the MAC layer, MAC-layer second processing on the data and/or the signaling, where the MAC-layer second processing includes MAC layer function processing other than hybrid automatic repeat request HARQ function processing and random access RA function processing; and/or the second satellite performs, at the above-MAC protocol layer, above-MAC protocol layer processing on the data and/or the signaling.

According to the satellite communication method in this embodiment of this application, the medium orbit satellite or the high orbit satellite receives, at the MAC layer or the above-MAC protocol layer, the data and/or the signaling. When the MAC layer function processing other than the HARQ function processing and/or the RA function processing needs to be performed, corresponding processing is performed in the second satellite. Alternatively, the second satellite performs the above-MAC protocol layer processing. In this way, complexity and costs of implementing an on-satellite system of the medium orbit satellite or the high orbit satellite are considered, and a part of processing is also performed in the medium orbit satellite or the high orbit satellite, so that a delay of processing the data and/or the signaling by a satellite communication system can be reduced.

Optionally, in some embodiments, that a second satellite receives, at a MAC layer or an above-MAC protocol layer, data and/or signaling in S410 may include: the second satellite receives, at the MAC layer or the above-MAC protocol layer, the data and/or the signaling sent by a terminal device, where the data and/or the signaling do/does not include a header of a below-MAC-layer protocol layer. Correspondingly, the terminal device performs, at the media access control MAC layer or the above-MAC protocol layer, transmission of data and/or signaling with the medium orbit satellite or the high orbit satellite.

The medium-orbit or high-orbit second satellite directly communicates, at the MAC layer or the above-MAC protocol layer, with the terminal device. The communication process may be concurrent with another communication step (for example, a signaling interaction step of a low-orbit first satellite). The delay of processing the data and/or the signaling by a satellite communication system can be further reduced.

Because only a MAC entity and an above-MAC protocol layer entity are deployed in the on-satellite system of the medium orbit satellite or the high orbit satellite, when communication with the second satellite is performed, data and/or signaling do/does not include the header of the below-MAC-layer protocol layer; otherwise, the on-satellite system of the medium orbit satellite or the high orbit satellite cannot process the data and/or the signaling. If transmission of data and/or signaling is performed at the above-MAC protocol layer, for example, an RLC layer or an RRC layer, the data and/or the signaling may alternatively not include a header of a below-RLC-layer or below-RRC-layer protocol layer. This is not limited in this application.

Optionally, in some other embodiments, that a second satellite receives, at a MAC layer or an above-MAC protocol layer, data and/or signaling in S410 may include: The second satellite receives, at the MAC layer or the above-MAC protocol layer, data and/or signaling sent by the first satellite, where the first satellite is a low orbit satellite. In other words, an orbital altitude of the second satellite is higher than an orbital altitude of the first satellite. A MAC entity and a below-MAC protocol layer entity are deployed in an on-satellite system of the first satellite. After receiving data and/or signaling, the on-satellite system may perform layer-by-layer processing from a lowest layer, and then send the data and/or the signaling to the second satellite. The communication process may be compatible with processing of a protocol stack of an existing mobile communication system.

Based on a two-layer satellite communication architecture, the following separately describes in detail an uplink solution for transmitting data and an uplink solution for transmitting signaling.

In a scenario in which a terminal device sends data, data processing performed by protocol layers of the terminal device includes:

(1) An SDAP layer maps a to-be-sent data stream to a radio bearer and then sends the data stream to a PDCP layer.

(2) The PDCP layer compresses an IP data header of the transmission control protocol (TCP)/user data protocol (UDP) and sends the compressed IP data header to an RLC layer.

(3) The RLC layer performs blocking and concatenation processing on a data packet, and then forwards the data packet to a MAC layer.

(4) The MAC layer multiplexes the data packet, selects an appropriate transport format combination, and sends the data packet to a PHY layer for modulation and coding.

(5) The data packet is sent at the PHY layer to a first satellite through an air interface.

Data processing performed by satellite-side protocol layers corresponding to the terminal device includes:

(1) The first satellite receives, at a PHY layer, data sent by the PHY layer of the terminal device, demodulates and decodes the data, and performs necessary retransmission processing on the data.

(2) The PHY layer of the first satellite sends the decoded data to a MAC layer of a second satellite, and the MAC layer of the second satellite performs operations, such as MAC header removing and de-multiplexing, on the data, and then sends the data to an RLC layer of the second satellite.

(3) The RLC layer of the second satellite reassembles the data packet and sends the reassembled data packet to a PDCP layer of the second satellite.

(4) The PDCP layer of the second satellite decrypts encrypted data, decompresses compressed IP data, and sends the data to a SDAP layer of the second satellite.

(5) The SDAP layer of the second satellite maps the data stream to obtain the original data sent by the terminal device, and then the second satellite sends the obtained data to a ground station.

In a scenario in which a terminal device sends signaling, signaling processing performed by protocol layers of the terminal device includes.

(1) The terminal device encapsulates the signaling through the RRC layer, and then sends the encapsulated signaling to a PDCP layer.

(2) The PDCP layer performs encryption and integrity protection operations on the received signaling and then sends the signaling to an RLC layer.

(3) The RLC layer performs blocking and concatenation operations on the signaling, and then forwards the signaling to a MAC layer.

(4) The MAC layer multiplexes the signaling, selects an appropriate transport format combination, and sends the signaling to a PHY layer.

(5) The PHY layer modulates and encodes the signaling, and then sends the signaling to a first satellite.

Signaling processing performed by satellite-side protocol layers corresponding to the terminal device includes:

(1) The first satellite receives, at a PHY layer, the signaling sent by the PHY layer of the terminal device, demodulates and decodes the signaling, and then sends the signaling to a MAC layer of the first satellite. If the signaling is RA process signaling, the first satellite directly feeds back an MSG 2 and an MSG 4 to the terminal device. If the signaling is an MSG 3 used when the terminal device performs RA, feedback on HARQ performed by the terminal device is also performed at the MAC layer of the first satellite. If the signaling is not random access process signaling, the MAC layer of the first satellite forwards the signaling to a MAC layer of the second satellite.

(2) The MAC layer of the second satellite performs operations, such as de-multiplexing and header removal, on the received signaling, and then sends the signaling to an RLC layer.

(3) The RLC layer of the second satellite reassembles the data and sends the data to a PDCP layer above the RLC layer.

(4) The PDCP layer of the second satellite performs decryption and integrity verification on the signaling, and then sends the signaling to an RRC layer of the second satellite.

(5) The RRC layer of the second satellite performs header removal processing on a header of the signaling, and notifies a ground station after the processing is completed.

The following describes in detail the satellite communication methods in this application by using several procedures such as an RA procedure, including a contention-based/non-contention-based RA procedure, an RRC connection procedure, and an RRC reconfiguration procedure as examples.

Figure 10:
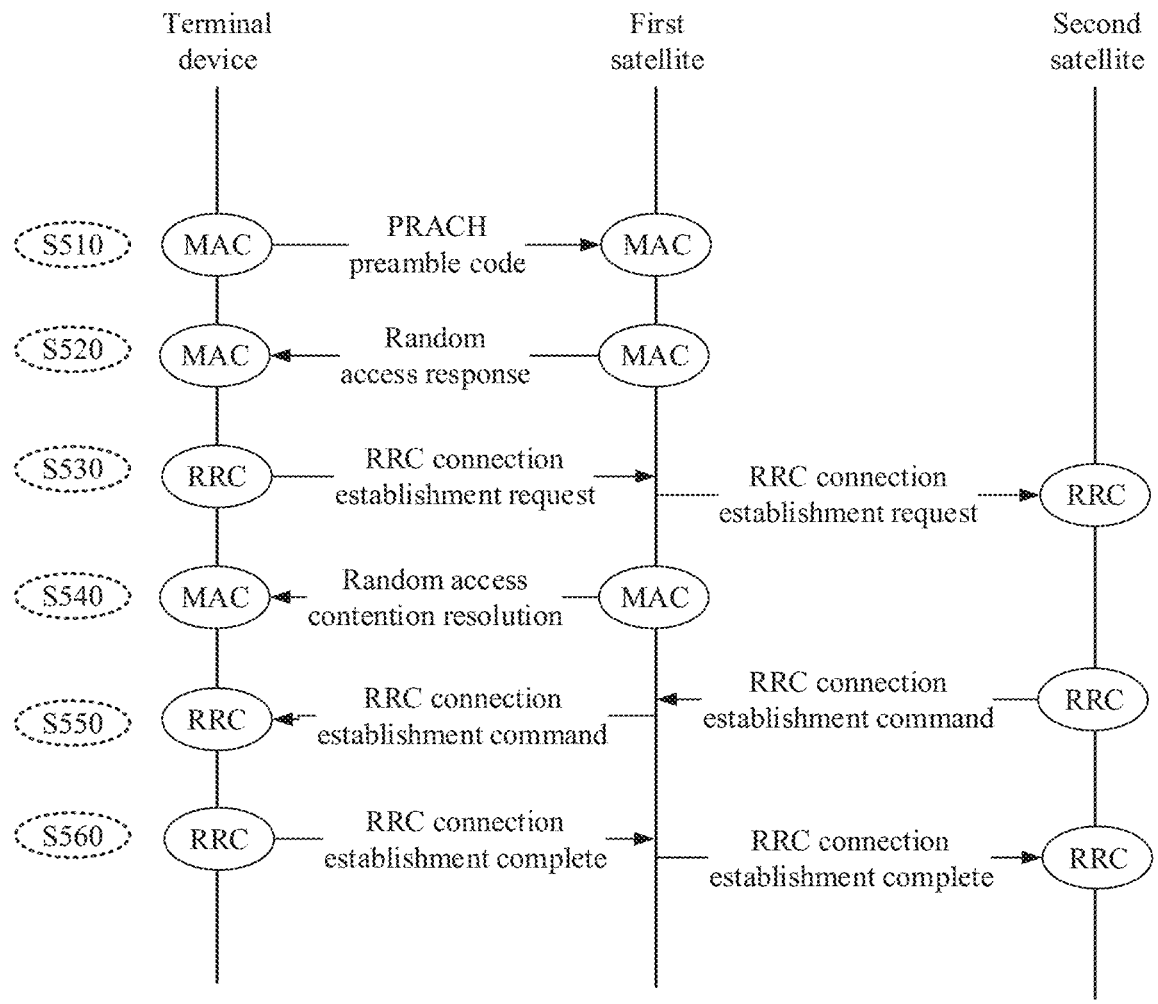
FIG. 10 is a schematic flowchart of a satellite communication method according to another embodiment of this application.

FIG. 10 is a schematic flowchart of a satellite communication method 500 according to another embodiment of this application. For ease of description, the embodiment in FIG. 10 is described by combining a contention-based RA procedure and an RRC connection procedure. As shown in FIG. 10, the satellite communication method 500 includes the following steps.

S510: A terminal device sends a physical random access channel (PRACH) preamble code to a first satellite. Correspondingly, the first satellite receives the PRACH preamble code sent by the terminal device. It should be understood that, in FIG. 10, MAC, RRC, or the like marked for the terminal device, the first satellite, and a second satellite means that corresponding signaling processing is performed at a MAC layer or an RRC layer. For example, the PRACH preamble code is MAC layer signaling. The first satellite receives, at a PHY layer, the PRACH preamble code sent by a PHY layer of the terminal device, performs corresponding processing, and then sends the PRACH preamble code to the MAC layer of the first satellite for signaling processing.

S520: After processing the PRACH preamble code, the first satellite feeds back a random access response to the terminal device.

S530: This step has two optional solutions. FIG. 10 shows the first optional solution. In the first optional solution, the terminal device sends an RRC connection establishment request to the first satellite. After receiving the signaling, the first satellite may perform layer-by-layer processing from the PHY layer, and then send the signaling to the second satellite through the MAC layer. The first optional solution may be compatible with protocol stack processing of an existing mobile communication system. In the second optional solution, the terminal device directly sends, at the MAC layer or at the RRC layer, an RRC connection establishment request to the second satellite. In the first optional solution, because S530 and S540 are concurrent, an access delay of the satellite communication system can be further reduced.

S540: The first satellite feeds back random access contention resolution signaling to the terminal device.

S550: In correspondence to step S530, this step also has two optional solutions. FIG. 10 shows the first optional solution. In the first optional solution, after receiving the RRC connection establishment request forwarded by the first satellite, the second satellite performs processing at the RRC layer, and feeds back an RRC connection establishment command to the terminal device through the first satellite. In the second optional solution, the second satellite directly feeds back, at the MAC layer or at the RRC layer, an RRC connection establishment command to the terminal device.

S560: In correspondence to steps S530 and S550, this step also has two optional solutions. FIG. 10 shows the first optional solution. In the first optional solution, the terminal device feeds back RRC connection establishment complete signaling to the first satellite, and after receiving the RRC connection establishment complete signaling from the terminal device, the first satellite forwards the RRC connection establishment complete signaling to the second satellite. In the second optional solution, the terminal device directly feeds back, at the MAC layer or at the RRC layer, an RRC connection establishment complete signaling to the second satellite.

Interaction of the first two pieces of signaling in the RA process in FIG. 10, namely, the PRACH preamble code and the random access response, can be completed merely through interaction between the terminal device and the first satellite. Therefore, the satellite communication method in this application can reduce the access delay.

Figure 11:
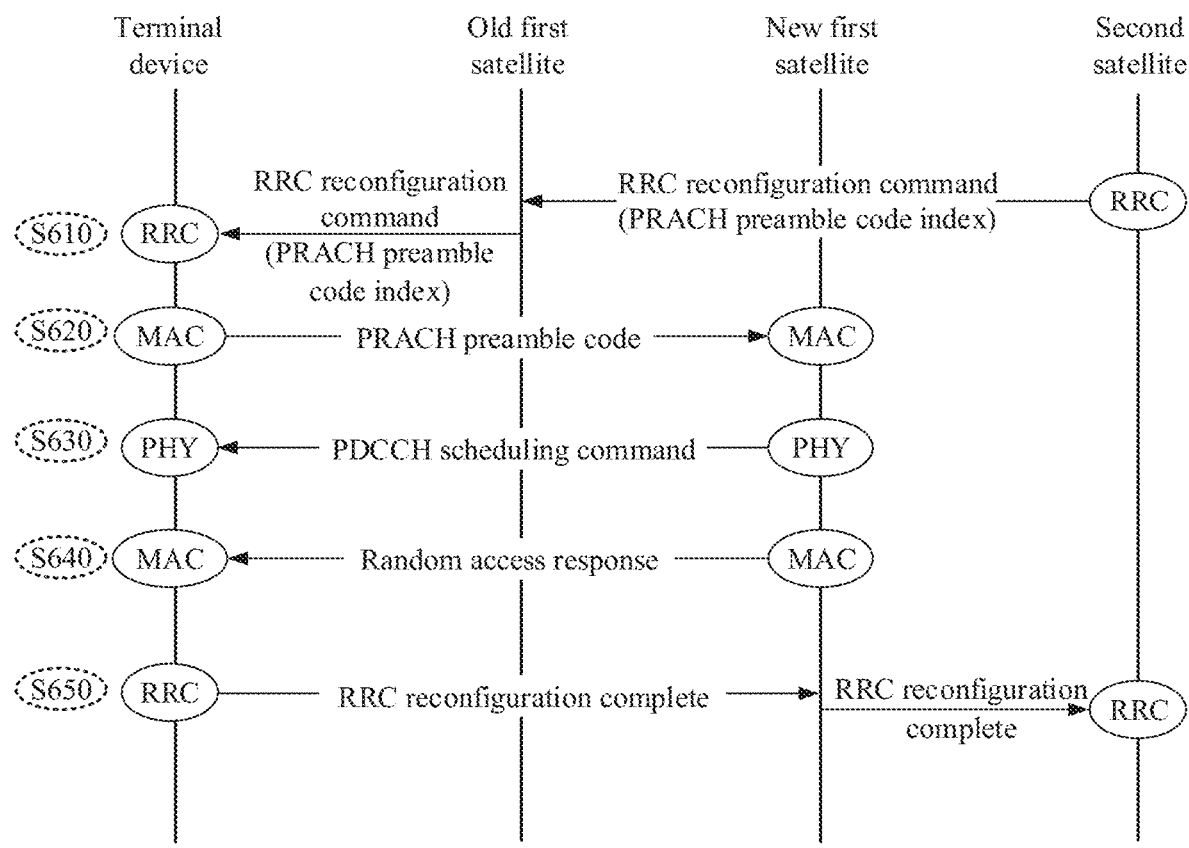
FIG. 11 is a schematic flowchart of a satellite communication method according to another embodiment of this application.

FIG. 11 is a schematic flowchart of a satellite communication method 600 according to another embodiment of this application. The embodiment of FIG. 11 is described by using a non-contention-based RA procedure. The non-contention-based RA procedure is mainly used in a scenario in which switching occurs for a user. In this case, the non-contention-based RA procedure is coupled with RRC connection reconfiguration. As shown in FIG. 11, an old first satellite represents a first satellite from which a service of the user is to be switched, and a new first satellite represents a first satellite that is to provide a service for the user. The satellite communication method 600 includes the following steps.

S610: The second satellite sends an RRC reconfiguration command, where the command includes an index of a PRACH preamble code used when switching occurs for a user. Similar to the satellite communication method 500, S610 has two optional solutions. In the first optional solution, the second satellite directly sends the RRC reconfiguration command to a terminal device. In the second optional solution, the second satellite forwards the RRC reconfiguration command to a terminal device through the old first satellite. Correspondingly, the terminal device receives the RRC reconfiguration command. It should be understood that, in FIG. 11, PHY, MAC, RRC, or the like marked for the terminal device, the old first satellite, the new first satellite, and the second satellite means that corresponding signaling processing is performed at a PHY layer, a MAC layer, or an RRC layer.

S620: The terminal device sends the PRACH preamble code to the new first satellite. In other words, the terminal device performs non-contention-based random access.

S630: The new first satellite sends a physical downlink control channel (physical downlink control channel, PDCCH) scheduling command to the terminal device.

S640: The new first satellite sends a random access response to the terminal device, where the random access response includes an index of a random access preamble code of the user, an uplink grant (UL_grant) resource, a timing advance, a temporary C-RNTI, and the like.

S650: The terminal device sends RRC reconfiguration complete signaling. S650 has two optional solutions. In the first optional solution, the terminal device directly sends the RRC reconfiguration complete signaling to the second satellite. In the second optional solution, the terminal device forwards the RRC reconfiguration complete signaling to the second satellite through the new first satellite.

Figure 12:
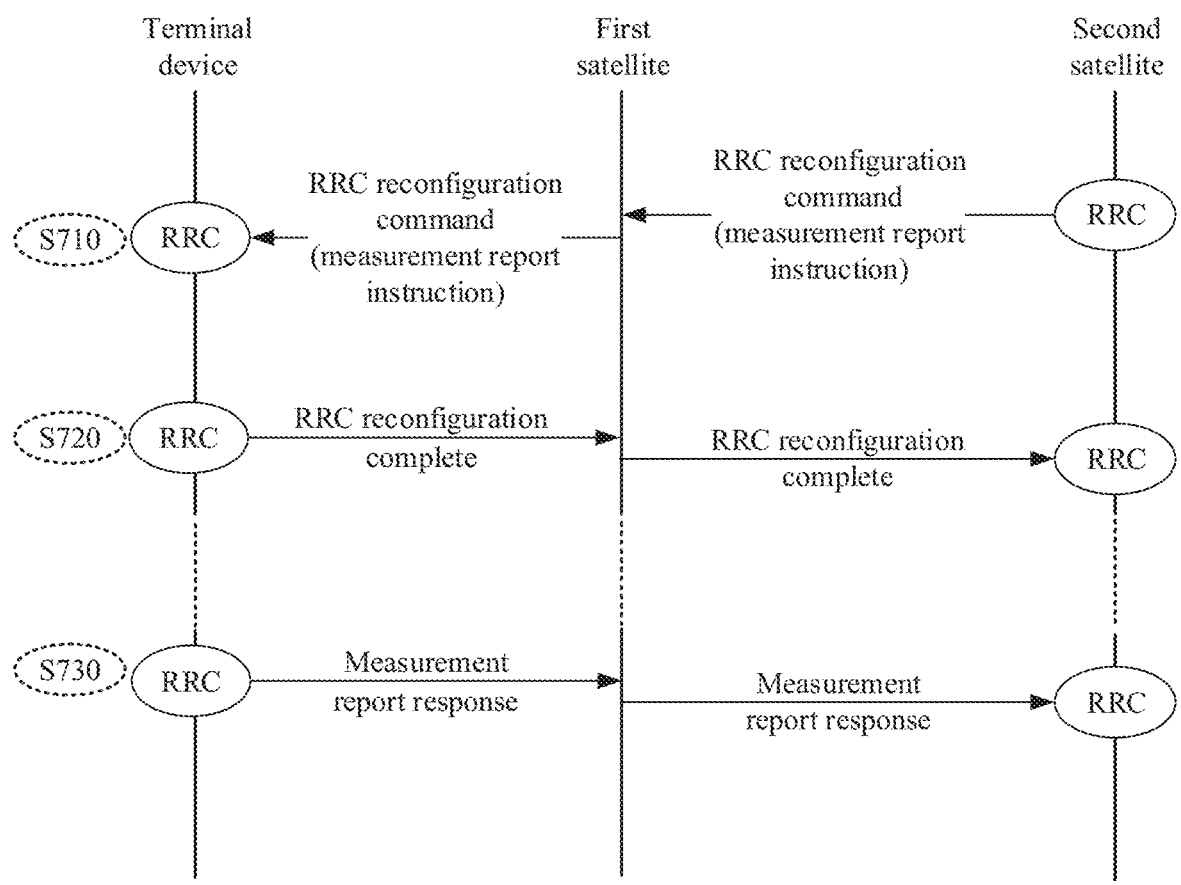
FIG. 12 is a schematic flowchart of a satellite communication method according to another embodiment of this application.

FIG. 12 is a schematic flowchart of a satellite communication method 700 according to another embodiment of this application. The embodiment in FIG. 12 is described by using an RRC reconfiguration procedure. Different from an RRC connection procedure, the RRC reconfiguration procedure is performed with reference to a measurement report. A first satellite moves, and this causes a terminal device to be handed over. In this case, a handover measurement report is triggered. In this case, a handover measurement report is triggered. A handover measurement report in a protocol of an NR system is sent by an RRC layer through an RRC reconfiguration command. After completing measurement, the terminal device feeds back the measurement report to a second satellite. The satellite communication method 700 includes the following steps.

S710: The second satellite sends an RRC reconfiguration command to the terminal device. The RRC reconfiguration command includes a measurement report instruction. It should be understood that, in FIG. 12, RRC marked for the terminal device, the first satellite, and the second satellite means that corresponding signaling processing is performed at an RRC layer.

S720: The terminal device returns RRC reconfiguration complete signaling to the second satellite.

S730: This step has two optional solutions. FIG. 12 shows the first optional solution. In the first optional solution, the terminal device arranges data generated after measurement is completed into a measurement report response, and sends the measurement report response to the first satellite, and the first satellite forwards the measurement report response to the second satellite. In the second optional solution, the terminal device directly sends the measurement report response to the second satellite. A difference from a ground mobile communication system is that, for an LTE system or an NR system, a measurement report response is fed back to a base station that provides a service for the terminal device, and in the embodiments of this application, the measurement report response needs to be fed back to a satellite that provides a service for the terminal device.

It should be understood that, similar to interaction of random access process signaling, interaction of HARQ process signaling and the like is also completed in the low-orbit first satellite. A HARQ process is not described in detail in this specification. Similar to interaction of RRC signaling, interaction of registration and authentication process signaling and the like is also completed in the medium-orbit or high-orbit second satellite. The registration and authentication process is not described in detail in this specification.

It should be understood that, for uplink data, the uplink data may be encapsulated in layers on a terminal device side based on a complete protocol stack structure in some embodiments of this application. On a satellite side, decapsulation may be performed at protocol layers of the first satellite and the second satellite in sequence. Downlink data processing is similar to uplink data processing, and details are not described herein again.

It should be further understood that, for uplink signaling, in some embodiments of this application, the signaling may be encapsulated in layers on the terminal device side based on the complete protocol stack structure. On the satellite side, the first satellite may perform corresponding processing for signaling decapsulation in a sequence of a PHY layer and a MAC layer, and then forward the signaling from the MAC layer of the first satellite to a MAC layer of the second satellite. The first satellite has performed decapsulation on the MAC layer. If the MAC layer of the second satellite does not need to perform MAC-layer second processing on the signaling, the MAC layer of the second satellite transparently transmits the signaling to an above-MAC protocol layer. If the MAC layer of the second satellite needs to perform MAC-layer second processing on the signaling, the MAC layer of the second satellite performs the MAC-layer second processing on the signaling, and after completing the MAC-layer second processing, sends the signaling to above-MAC protocol layers.

In some other embodiments of this application, signaling may be encapsulated in layers on a terminal device side based on a complete protocol stack structure. A header of a MAC layer may include information about whether MAC-layer first processing needs to be performed. On a satellite side, the first satellite performs decapsulation at a PHY layer. If the information in the header of the MAC layer indicates that the MAC-layer first processing needs to be performed, the first satellite performs decapsulation on the MAC layer and performs the MAC-layer first processing, and after the MAC-layer first processing is completed, the MAC layer of the first satellite sends the signaling to a MAC layer of the second satellite. If the information in the header of the MAC layer indicates that the MAC-layer first processing does not need to be performed, the first satellite does not perform decapsulation on the MAC layer, and directly sends the signaling to a MAC layer of the second satellite, and the MAC layer of the second satellite decapsulates the signaling, and then performs MAC-layer second processing or above-MAC protocol layer processing.

In still some other embodiments of this application, for MAC layer signaling or above-MAC protocol layer signaling, on a terminal device side, the signaling may be encapsulated in layers from a MAC layer to above-MAC protocol layers. The terminal device directly communicates with the second satellite without using the first satellite. On a satellite side, a MAC layer of the second satellite decapsulates the signaling, and then performs MAC-layer second processing or above-MAC protocol layer processing.

In still some other embodiments of this application, for above-MAC protocol layer signaling, on a terminal device side, the signaling may be encapsulated in layers from a corresponding protocol layer (for example, an RRC layer). The terminal device directly communicates with the second satellite without using the first satellite. On a satellite side, an RRC layer of the second satellite decapsulates the signaling, and then performs RRC layer processing.

Downlink signaling processing is similar to uplink signaling processing, and details are not described herein again.

In solutions on which FIG. 8 to FIG. 12 are based, an ARQ function module of an RLC entity is located in the second satellite. When ARQ function processing needs to be performed on the data and/or the signaling, the second satellite performs the ARQ function processing on the data and/or the signaling.

In another embodiment of this application, an ARQ function module of an RLC entity may be located in the first satellite. When ARQ function processing needs to be performed on the data and/or the signaling, the first satellite performs the ARQ function processing on the data and/or the signaling. Therefore, when the ARQ function processing is involved, the ARQ function processing is performed in the low-orbit first satellite, so that a delay of a satellite communication system can be further reduced. In other words, a protocol stack of a low orbit satellite includes a PHY layer, a HARQ function module and an RA function module of a MAC layer, and an ARQ function module of an RLC layer. A protocol stack of a medium orbit satellite or a high orbit satellite includes an RLC (TM/UM Mode) layer protocol stack and an above-RLC layer protocol stack, and the high orbit satellite includes only a transparent mode (TM)/an unacknowledged mode (UM).

Figure 13:
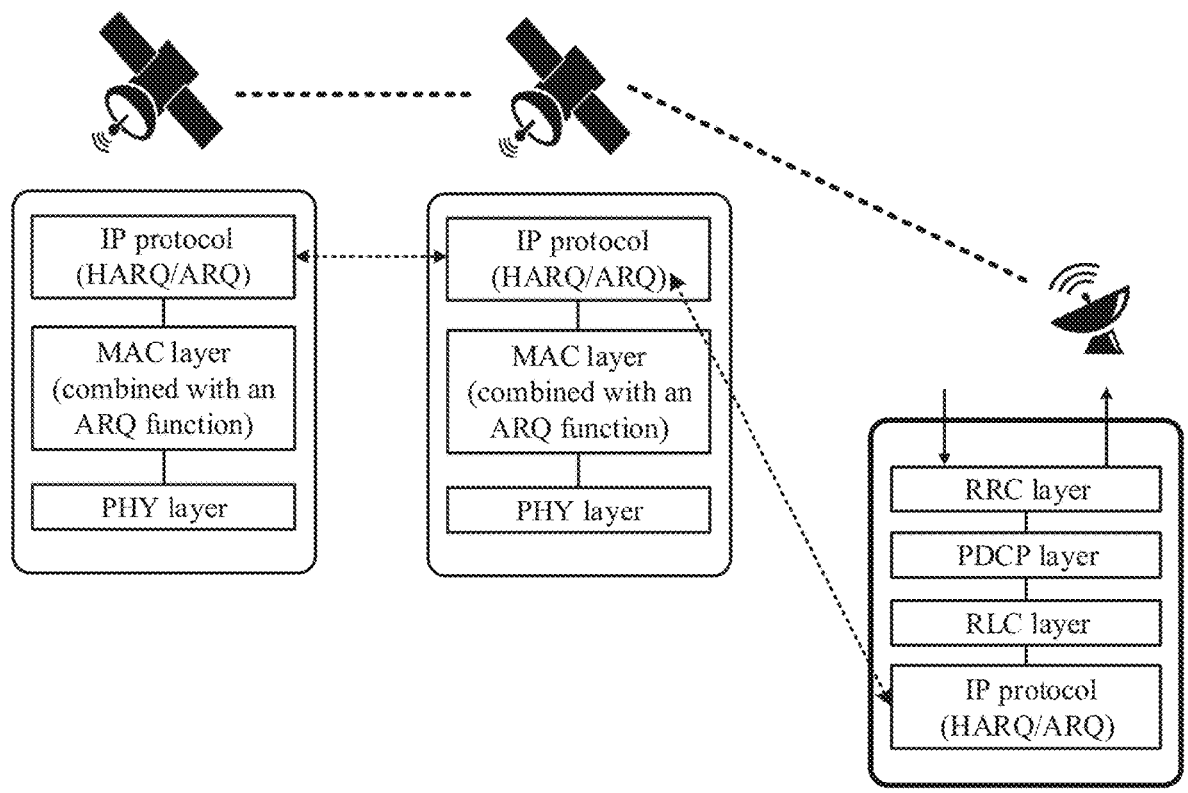
FIG. 13 is a schematic diagram of protocol stack deployment in a single-layer satellite communication architecture according to an embodiment of this application.

A solution of a single-layer satellite communication architecture is different from a solution of a multi-layer satellite communication architecture in that, complexity of an on-satellite system and stability of data transmission are main factors for consideration in protocol stack division. In an embodiment provided for the single-layer satellite communication architecture in this application, a protocol stack of an on-satellite system of a satellite (where the single-layer satellite communication architecture includes only a first satellite) includes a PHY layer and a MAC layer, where a HARQ function of the MAC layer and an ARQ function of an RLC layer are combined into the MAC layer. A protocol stack of a ground station includes another function module, other than the ARQ function, in an RLC layer, and an above-RLC layer. That is, the RLC layer of the protocol stack of the ground station has only the UM/TM. Transmission between satellites and between a satellite and a ground station is performed based on the IP protocol. To ensure stability of data transmission between the satellites and between the satellite and the ground station, a HARQ function module/an ARQ function module may be added, to ensure reliability of data transmission between the MAC layer and the RLC layer. In this case, the RLC layer in the ground station no longer has a data reassembling function. FIG. 13 is a schematic diagram of protocol stack deployment in a single-layer satellite communication architecture according to an embodiment of this application.

Figure 14:
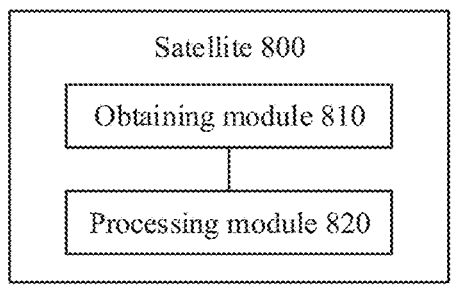
FIG. 14 is a schematic block diagram of a satellite according to an embodiment of this application.

FIG. 14 is a schematic block diagram of a satellite 800 according to an embodiment of this application. The satellite 800 is a low orbit satellite. An on-satellite system of the satellite 800 includes a MAC entity and a below-MAC protocol layer entity, and the MAC entity includes a hybrid automatic repeat request HARQ function module and a random access RA function module. The satellite 800 includes an obtaining module 810 and a processing module 820. The obtaining module 810 is configured to obtain, at a MAC layer, data and/or signaling. The processing module 820 is configured to: when MAC-layer first processing needs to be performed on the data and/or the signaling, perform the MAC-layer first processing on the data and/or the signaling, where the MAC-layer first processing includes at least one of performing HARQ function processing by using the HARQ function module and performing RA function processing by using the RA function module.

According to this embodiment of this application, the low orbit satellite obtains, at the MAC layer, the data and/or the signaling, and when the HARQ function processing and/or the RA function processing need/needs to be performed, the low orbit satellite performs the HARQ function processing and/or the RA function processing. In this way, complexity and costs of implementing an on-satellite system of the low orbit satellite are considered, and the HARQ function processing and/or the RA function processing are/is also performed in the low orbit satellite, so that a delay of processing the data and/or the signaling by a satellite communication system can be reduced.

Optionally, in some embodiments, the on-satellite system of the satellite 800 further includes an RLC entity, and the RLC entity includes an automatic repeat request ARQ function module. The processing module 820 is further configured to: when ARQ function processing needs to be performed on the data and/or the signaling, perform the ARQ function processing on the data and/or the signaling.

Optionally, in some embodiments, the processing module 820 is configured to: when MAC-layer second processing or above-MAC protocol layer processing needs to be performed on the data and/or the signaling, send the data and/or the signaling to a second satellite, where the MAC-layer second processing includes MAC layer function processing other than the HARQ function processing and the RA function processing, and the second satellite is a medium orbit satellite or a high orbit satellite.

Optionally, in some embodiments, the obtaining module 810 is specifically configured to: receive, at a physical PHY layer in a below-MAC protocol layer, the data and/or the signaling that are/is sent by a terminal device, perform PHY layer processing on the data and/or the signaling, and then send the data and/or the signaling to the MAC layer.

Optionally, in some embodiments, the signaling on which the MAC-layer first processing needs to be performed includes random access process signaling and/or HARQ process signaling.

Optionally, in some embodiments, the signaling on which the above-MAC protocol layer processing needs to be performed includes radio resource control RRC signaling.

Optionally, in some embodiments, the MAC entity further includes a first MAC control module configured to control a HARQ function and an RA function.

Figure 15:
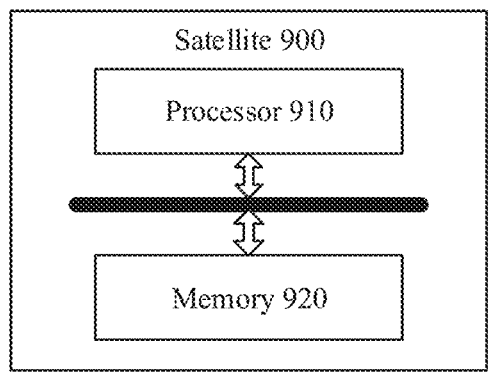
FIG. 15 is a schematic block diagram of a satellite according to another embodiment of this application.

FIG. 15 is a schematic block diagram of a satellite 900 according to another embodiment of this application. The satellite 900 is a low orbit satellite. The satellite 900 shown in FIG. 15 may include a processor 910 and a memory 920. The memory 920 stores computer instructions, and when the processor 910 executes the computer instructions, the satellite 900 is enabled to perform the following steps: obtaining, at a MAC layer, data and/or signaling; and when MAC-layer first processing needs to be performed on the data and/or the signaling, performing the MAC-layer first processing on the data and/or the signaling, where the MAC-layer first processing includes at least one of hybrid automatic repeat request HARQ function processing and random access RA function processing.

According to this embodiment of this application, the low orbit satellite obtains, at the MAC layer, the data and/or the signaling, and when the HARQ function processing and/or the RA function processing need/needs to be performed, the low orbit satellite performs the HARQ function processing and/or the RA function processing. In this way, complexity and costs of implementing an on-satellite system of the low orbit satellite are considered, and the HARQ function processing and/or the RA function processing are/is also performed in the low orbit satellite, so that a delay of processing the data and/or the signaling by a satellite communication system can be reduced.

Optionally, in some embodiments, an on-satellite system of the satellite 900 includes a MAC entity and a below-MAC protocol layer entity, and the MAC entity includes a hybrid automatic repeat request HARQ function module and a random access RA function module.

Optionally, in some embodiments, the on-satellite system of the satellite 900 further includes an RLC entity, and the RLC entity includes an automatic repeat request ARQ function module. The processor 910 is further configured to execute the computer instructions, to enable the satellite 900 to perform the following step: when ARQ function processing needs to be performed on the data and/or the signaling, performing the ARQ function processing on the data and/or the signaling.

Optionally, in some embodiments, the processor 910 is further configured to execute the computer instructions, to enable the satellite 900 to perform the following step: when MAC-layer second processing or above-MAC protocol layer processing needs to be performed on the data and/or the signaling, sending the data and/or the signaling to a second satellite, where the MAC-layer second processing includes MAC layer function processing other than the HARQ function processing and the RA function processing, and the second satellite is a medium orbit satellite or a high orbit satellite.

Optionally, in some embodiments, that the processor 910 executes the computer instructions to enable the satellite 900 to obtain, at a MAC layer, data and/or signaling includes: receiving, at a physical PHY layer in a below-MAC protocol layer, the data and/or the signaling that are/is sent by a terminal device, performing PHY layer processing on the data and/or the signaling, and then sending the data and/or the signaling to the MAC layer.

Optionally, in some embodiments, the signaling on which the MAC-layer first processing needs to be performed includes random access process signaling and/or HARQ process signaling.

Optionally, in some embodiments, the signaling on which the above-MAC protocol layer processing needs to be performed includes radio resource control RRC signaling.

Optionally, in some embodiments, the MAC entity further includes a first MAC control module configured to control a HARQ function and an RA function.

It should be understood that the satellite 800 shown in FIG. 14 or the satellite 900 shown in FIG. 15 may be configured to perform an operation or a procedure of the low orbit satellite in the foregoing method embodiments, and the operations and/or the functions of the modules and the components in the satellite 800 or the satellite 900 are respectively intended to implement the corresponding procedures of the low orbit satellite in the foregoing method embodiments. For brevity, details are not described herein again.

Figure 16:
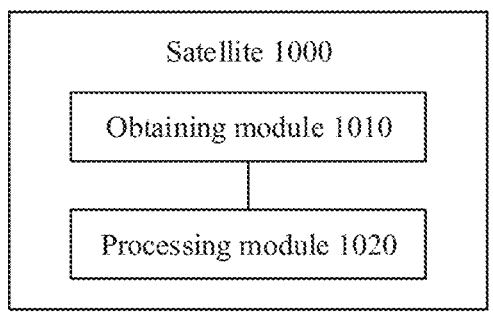
FIG. 16 is a schematic block diagram of a satellite according to still another embodiment of this application.

FIG. 16 is a schematic block diagram of a satellite 1000 according to still another embodiment of this application. The satellite 1000 is a medium orbit satellite or a high orbit satellite. An on-satellite system of the satellite 1000 includes a MAC entity and an above-MAC protocol layer entity, and the MAC entity includes another MAC layer function module other than a hybrid automatic repeat request HARQ function module and a random access RA function module. The satellite 1000 includes an obtaining module 1010 and a processing module 1020. The obtaining module 1010 is configured to obtain, at a MAC layer or an above-MAC protocol layer, data and/or signaling. The processing module 1020 is configured to: perform MAC-layer second processing on the data and/or the signaling by using the another MAC layer function module, where the MAC-layer second processing includes MAC layer function processing other than hybrid automatic repeat request HARQ function processing and random access RA function processing: and/or perform above-MAC protocol layer processing on the data and/or the signaling by using an above-MAC protocol layer entity.

According to this embodiment of this application, the medium orbit satellite or the high orbit satellite receives, at the MAC layer or the above-MAC protocol layer, the data and/or the signaling. When the MAC layer function processing other than the HARQ function processing and/or the RA function processing needs to be performed, corresponding processing is performed in the second satellite. Alternatively, the second satellite performs the above-MAC protocol layer processing. In this way, complexity and costs of implementing an on-satellite system of the medium orbit satellite or the high orbit satellite are considered, and a part of processing is also performed in the medium orbit satellite or the high orbit satellite, so that a delay of processing the data and/or the signaling by a satellite communication system can be reduced.

Optionally, in some embodiments, the on-satellite system of the satellite 1000 further includes an RLC entity, and the RLC entity includes an automatic repeat request ARQ function module. The processing module 1020 is further configured to: when ARQ function processing needs to be performed on the data and/or the signaling, perform the ARQ function processing on the data and/or the signaling.

Optionally, in some embodiments, the obtaining module 1010 is specifically configured to receive, at the MAC layer or the above-MAC protocol layer, the data and/or the signaling that are/is sent by a terminal device, where the data and/or the signaling do/does not include a header of a below-MAC-layer protocol layer.

Optionally, in some embodiments, the obtaining module 1010 is specifically configured to receive, at the MAC layer or the above-MAC protocol layer, data and/or signaling that are/is sent by a first satellite, where the first satellite is a low orbit satellite.

Optionally, in some embodiments, the signaling on which the above-MAC protocol layer processing is performed by using the above-MAC protocol layer entity includes radio resource control RRC signaling.

Optionally, in some embodiments, the MAC entity further includes a second MAC control module for another MAC layer function other than the HARQ function and the RA function.

Figure 17:
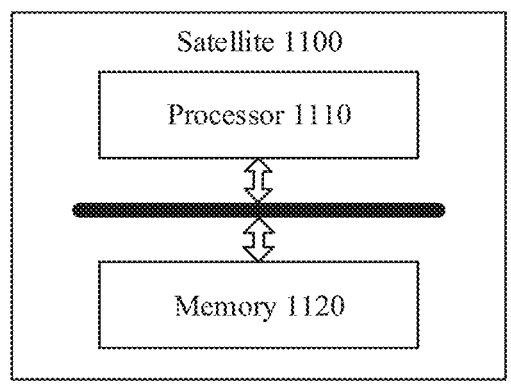
FIG. 17 is a schematic block diagram of a satellite according to still another embodiment of this application.

FIG. 17 is a schematic block diagram of a satellite 1100 according to still another embodiment of this application. The satellite 1100 is a medium orbit satellite or a high orbit satellite. The satellite 1100 shown in FIG. 17 may include a processor 1110 and a memory 1120. The memory 1120 stores computer instructions, and when the processor 1110 executes the computer instructions, the satellite 1100 is enabled to perform the following steps: receiving, at a MAC layer or an above-MAC protocol layer, data and/or signaling; and performing, at the MAC layer, MAC-layer second processing on the data and/or the signaling, where the MAC-layer second processing includes MAC layer function processing other than hybrid automatic repeat request HARQ function processing and random access RA function processing: and/or performing, by the second satellite, at the above-MAC protocol layer, above-MAC protocol layer processing on the data and/or the signaling.

According to this embodiment of this application, the medium orbit satellite or the high orbit satellite receives, at the MAC layer or the above-MAC protocol layer, the data and/or the signaling. When the MAC layer function processing other than the HARQ function processing and/or the RA function processing needs to be performed, corresponding processing is performed in the second satellite. Alternatively, the second satellite performs the above-MAC protocol layer processing. In this way, complexity and costs of implementing an on-satellite system of the medium orbit satellite or the high orbit satellite are considered, and a part of processing is also performed in the medium orbit satellite or the high orbit satellite, so that a delay of processing the data and/or the signaling by a satellite communication system can be reduced.

Optionally, in some embodiments, an on-satellite system of the satellite 1100 includes a MAC entity and an above-MAC protocol layer entity, and the MAC entity includes another MAC layer function module other than a hybrid automatic repeat request HARQ function module and a random access RA function module.

Optionally, in some embodiments, the on-satellite system of the satellite 1100 further includes an RLC entity, and the RLC entity includes an automatic repeat request ARQ function module. The processor 1110 is further configured to execute the computer instructions, to enable the satellite 1100 to perform the following step: when ARQ function processing needs to be performed on the data and/or the signaling, performing the ARQ function processing on the data and/or the signaling.

Optionally, in some embodiments, that the processor 1110 executes the computer instructions to enable the satellite 1100 to receive, at a MAC layer or an above-MAC protocol layer, data and/or signaling includes: receiving, at the MAC layer or the above-MAC protocol layer, the data and/or the signaling that are/is sent by a terminal device, where the data and/or the signaling do/does not include a header of a below-MAC-layer protocol layer.

Optionally, in some embodiments, that the processor 1110 executes the computer instructions to enable the satellite 1100 to receive, at a MAC layer or an above-MAC protocol layer, data and/or signaling includes: receiving, at the MAC layer or the above-MAC protocol layer, data and/or signaling that are/is sent by a first satellite, where the first satellite is a low orbit satellite.

Optionally, in some embodiments, the signaling on which the above-MAC protocol layer processing is performed by using the above-MAC protocol layer entity includes radio resource control RRC signaling.

Optionally, in some embodiments, the MAC entity further includes a second MAC control module for another MAC layer function other than the HARQ function and the RA function.

It should be understood that the satellite 1000 shown in FIG. 16 or the satellite 1100 shown in FIG. 17 may be configured to perform an operation or a procedure of the medium orbit satellite or the high orbit satellite in the foregoing method embodiments, and the operations and/or the functions of the modules and the components in the satellite 1000 or the satellite 1100 are respectively intended to implement the corresponding procedures of the medium orbit satellite or the high orbit satellite in the foregoing method embodiments. For brevity, details are not described herein again.

This application further provides a terminal device. The terminal device includes: a transmission module, configured to perform, at a physical PHY layer, transmission of data and/or signaling with a first satellite, where the first satellite is a low orbit satellite, where the transmission module is further configured to perform, at a medium access control MAC layer or an above-MAC protocol layer, transmission of data and/or signaling with a second satellite, where the data and/or the signaling whose transmission is performed with the second satellite do/does not include a header of a below-MAC-layer protocol layer, and the second satellite is a medium orbit satellite or a high orbit satellite.

This application further provides a terminal device. The terminal device includes a processor and a memory. The memory stores computer instructions, and when the processor executes the computer instructions, the terminal device is enabled to perform the following steps: performing, at a physical PHY layer, transmission of data and/or signaling with a first satellite, where the first satellite is a low orbit satellite; and performing, at a medium access control MAC layer or an above-MAC protocol layer, transmission of data and/or signaling with a second satellite, where the data and/or the signaling do/does not include a header of a below-MAC-layer protocol layer, and the second satellite is a medium orbit satellite or a high orbit satellite.

This application further provides a satellite communication system, including a satellite 800 (or a satellite 900), a satellite 1000 (or a satellite 1100), and a ground station.

This application further provides a satellite communication system, including a satellite 800 (or a satellite 900) and a ground station.

It should be understood that the processor mentioned in this embodiment of this application may include a central processing unit (CPU), a network processor (NP), or a combination of a CPU and an NP. The processor may further include a hardware chip. The hardware chip may be an application-specific integrated circuit (application-specific integrated circuit, ASIC), a programmable logic device (PLD), or a combination thereof. The PLD may be a complex programmable logic device (CPLD), a field-programmable gate array (FPGA), a generic array logic (GAL), or any combination thereof.

It may be further understood that the memory mentioned in this embodiment of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), a flash memory, a hard disk drive (HDD), or a solid-state drive (SSD). The volatile memory may be a random access memory (RAM), and is used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

An embodiment of this application further provides a computer-readable storage medium. The computer-readable storage medium stores instructions. When the instructions are run on a computer, the computer is enabled to perform a step performed by the low orbit satellite in the foregoing method embodiments.

An embodiment of this application further provides a computer-readable storage medium. The computer-readable storage medium stores instructions. When the instructions are run on a computer, the computer is enabled to perform a step performed by the medium orbit satellite or the high orbit satellite in the foregoing method embodiments.

An embodiment of this application further provides a computer program product including instructions, and when a computer runs the instructions of the computer program product, the computer performs a step performed by the low orbit satellite in the foregoing method embodiments.

An embodiment of this application further provides a computer program product including instructions, and when a computer runs the instructions of the computer program product, the computer performs a step performed by the medium orbit satellite or the high orbit satellite in the foregoing method embodiments.

An embodiment of this application further provides a computer chip. The computer chip enables a computer to perform a step performed by the low orbit satellite in the foregoing method embodiments.

An embodiment of this application further provides a computer chip. The computer chip enables a computer to perform a step performed by the medium orbit satellite or the high orbit satellite in the foregoing method embodiments.

All or some of the devices provided in the embodiments of this application may be implemented by using software, hardware, firmware, or any combination thereof. When software is used to implement the devices, all or some of the devices may be implemented in a form of a computer program product. The computer program product includes one or more computer instructions. When the computer instructions are loaded and executed on a computer, all or some of the procedures or functions according to the embodiments of this application are generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, including one or more usable media that are integrated. The usable medium may be a magnetic medium (for example, a floppy disk, a hard disk, or a magnetic tape), an optical medium (for example, a high-density digital video disc (DVD)), a semiconductor medium (for example, an SSD), or the like.

It should be understood that first, second, and various serial numbers in this specification are merely for purpose of distinction for ease of description, but are not intended to limit the scope of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification usually represents an "or" relationship between associated objects.

It should be understood that sequence numbers of the foregoing processes do not mean an execution sequence in the embodiments of this application. The execution sequence of the processes should be determined based on functions and internal logic of the processes, and should not be construed as any limitation on the implementation processes of the embodiments of this application.

A person of ordinary skill in the art may be aware that, units and algorithm steps in examples described with reference to the embodiments disclosed in this specification can be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

It may be clearly understood by the person skilled in the art that, for a purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the apparatus embodiments described in the foregoing are only examples. For example, division of the units is only a type of division of logical functions, and may be another manner of division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit.

The foregoing descriptions are merely specific implementations of this application, but the protection scope of this application is not limited thereto. Any variation or replacement that can be readily figured out by the person skilled in the art within the technical scope disclosed in this application shall fall within the protection scope of this application. Therefore, the protection scope of this application shall be subject to the protection scope of the claims.

What is claimed is:

1. A satellite communication method, comprising:
obtaining, by a first satellite, at a media access control (MAC) layer, at least one of data or signaling, wherein the first satellite is a low orbit satellite;
in response to MAC-layer first processing needing to be performed on the at least one of the data or the signaling, performing, by the first satellite, the MAC-layer first processing on the at least one of the data or the signaling, wherein the MAC-layer first processing comprises at least one of hybrid automatic repeat request (HARQ) function processing or random access (RA) function processing; and
in response to MAC-layer second processing or above-MAC protocol layer processing needing to be performed on the at least one of the data or the signaling, sending, by the first satellite, the at least one of the data or the signaling to a second satellite, wherein the MAC-layer second processing comprises MAC layer function processing other than the HARQ function processing and the RA function processing, and wherein the second satellite is a medium orbit satellite or a high orbit satellite, wherein the at least one of the data or the signaling does not comprise a header of a below-MAC-layer protocol layer.

2. The satellite communication method according to claim 1, wherein an on-satellite system of the first satellite comprises a MAC entity and a below-MAC protocol layer entity, and wherein the MAC entity comprises a HARQ function module and a RA function module.

3. The satellite communication method according to claim 2, wherein the MAC entity further comprises a first MAC control module that controls a HARQ function and an RA function.

4. The satellite communication method according to claim 1, wherein the satellite communication method further comprises:
   in response to automatic repeat request (ARQ) function processing needing to be performed on the at least one of the data or the signaling, performing, by the first satellite, the ARQ function processing on the at least one of the data or the signaling.

5. The satellite communication method according to claim 4, wherein an on-satellite system of the first satellite comprises a radio link control (RLC) entity, and wherein the RLC entity comprises an ARQ function module.

6. The satellite communication method according to claim 1, wherein the obtaining, by a first satellite, at a MAC layer, at least one of data or signaling comprises:
   receiving, by the first satellite, at a physical PHY layer, the at least one of the data or the signaling that is sent by a terminal device;
   performing PHY layer processing on the at least one of the data or the signaling; and
   sending the at least one of the data or the signaling to the MAC layer.

7. The satellite communication method according to claim 1, wherein the signaling on which the MAC-layer first processing needing to be performed comprises at least one of random access process signaling or HARQ process signaling.

8. The satellite communication method according to claim 1, wherein the signaling on which an above-MAC protocol layer processing needing to be performed comprises radio resource control (RRC) signaling.

9. A satellite communication method, comprising:
   receiving, by a second satellite, at a media access control (MAC) layer or an above-MAC protocol layer, at least one of data or signaling, wherein the second satellite is a medium orbit satellite or a high orbit satellite, wherein the at least one of the data or the signaling does not comprise a header of a below-MAC-layer protocol layer; and
   at least one of:
      performing, by the second satellite, at the MAC layer, MAC-layer second processing on at least one of the data or the signaling, wherein the MAC-layer second processing comprises MAC layer function processing other than hybrid automatic repeat request (HARQ) function processing and random access (RA) function processing; or
      performing, by the second satellite, at the above-MAC protocol layer, above-MAC protocol layer processing on the at least one of the data or the signaling.

10. The satellite communication method according to claim 9, wherein an on-satellite system of the second satellite comprises a MAC entity and an above-MAC protocol layer entity, and wherein the MAC entity comprises another MAC layer function module other than a HARQ function module and a RA function module.

11. The satellite communication method according to claim 10, wherein the MAC entity further comprises a second MAC control module that controls another MAC layer function other than a HARQ function and an RA function.

12. The satellite communication method according to claim 9, wherein the satellite communication method further comprises:
   in response to automatic repeat request (ARQ) function processing needing to be performed on the at least one of the data or the signaling, performing, by the second satellite, the ARQ function processing on the at least one of the data or the signaling.

13. The satellite communication method according to claim 12, wherein an on-satellite system of the second satellite further comprises a radio link control (RLC) entity, and wherein the RLC entity comprises an ARQ function module.

14. The satellite communication method according to claim 9, wherein the signaling on which the above-MAC protocol layer processing is performed at the above-MAC protocol layer comprises radio resource control (RRC) signaling.

15. A satellite, comprising:
   an on-satellite system, comprising:
      a media access control (MAC) entity, wherein the MAC entity comprises a hybrid automatic repeat request (HARQ) function module and a random access RA function module; and
      a below-MAC protocol layer entity;
   at least one processor; and
   one or more memories coupled to the at least one processor and storing computer instructions for execution by the at least one processor, wherein the computer instructions instruct the at least one processor to:
      obtain at least one of data or signaling, wherein the satellite is a low orbit satellite;
      in response to MAC-layer first processing needing to be performed on the at least one of the data or the signaling, perform, the MAC-layer first processing on the at least one of the data or the signaling, wherein the MAC-layer first processing comprises at least one of hybrid automatic repeat request (HARQ) function processing and random access (RA) function processing; and
      in response to MAC-layer second processing or above-MAC protocol layer processing needing to be performed on the at least one of the data or the signaling, send, by the first satellite, the at least one of the data or the signaling to a second satellite, wherein the MAC-layer second processing comprises MAC layer function processing other than the HARQ function processing and the RA function processing, and wherein the second satellite is a medium orbit satellite or a high orbit satellite,
   wherein the at least one of the data or the signaling does not comprise a header of a below-MAC-layer protocol layer.

16. The satellite according to claim 15, wherein the on-satellite system further comprises a radio link control (RLC) entity, wherein the RLC entity comprises an automatic repeat request (ARQ) function module, and wherein the computer instructions further instruct the at least one processor to:

in response to ARQ function processing needing to be performed on the at least one of the data or the signaling, perform the ARQ function processing on the at least one of the data or the signaling.

17. A satellite, wherein the satellite is a medium orbit satellite or a high orbit satellite comprising an on-satellite system that comprises a media access control MAC entity and an above-MAC protocol layer entity, the MAC entity comprises another MAC layer function module other than a hybrid automatic repeat request HARQ function module and a random access RA function module, and the satellite comprises a processor and at least one memory, the at least one memory stores computer instructions, and when the processor executes the computer instructions, the satellite is enabled to:
  receive, at a media access control MAC layer or an above-MAC protocol layer, at least one of data or signaling, wherein the second satellite is a medium orbit satellite or a high orbit satellite, wherein the at least one of the data or the signaling does not comprise a header of a below-MAC-layer protocol layer; and
  perform, at the MAC layer, MAC-layer second processing on the data and/or the signaling, wherein the MAC-layer second processing comprises MAC layer function processing other than hybrid automatic repeat request HARQ function processing and random access RA function processing; and/or performing, by the second satellite, at the above-MAC protocol layer, above-MAC protocol layer processing on the data and/or the signaling.

18. The satellite according to claim 17, wherein the on-satellite system of the satellite further comprises a radio link control RLC entity, wherein the RLC entity comprises an automatic repeat request ARQ function module, and wherein when the processor executes the computer instructions, the satellite is further enabled to:
  perform, when automatic repeat request ARQ function processing needs to be performed on the data and/or the signaling, the ARQ function processing on the data and/or the signaling.

* * * * *

UNITED STATES PATENT AND TRADEMARK OFFICE
CERTIFICATE OF CORRECTION

| | | |
|---|---|---|
| PATENT NO. | : 11,606,136 B2 | Page 1 of 1 |
| APPLICATION NO. | : 17/329718 | |
| DATED | : March 14, 2023 | |
| INVENTOR(S) | : Jun Chen et al. | |

It is certified that error appears in the above-identified patent and that said Letters Patent is hereby corrected as shown below:

On the Title Page

In Column 2 (Primary Examiner), In Line 1, Delete "Shirpal" and insert -- Shripal --.

In the Claims

In Column 32, In Line 1, In Claim 15, delete "RA" and insert -- (RA) --.

In Column 33, In Line 7, In Claim 17, delete "MAC" and insert -- (MAC) --.

In Column 33, In Line 10, In Claim 17, delete "HARQ" and insert -- (HARQ) --.

In Column 33, In Line 11, In Claim 17, delete "RA" and insert -- (RA) --.

In Column 33, In Line 16, In Claim 17, delete "MAC" and insert -- (MAC) --.

In Column 34, In Line 5, In Claim 17, delete "HARQ" and insert -- (HARQ) --.

In Column 34, In Line 5, In Claim 17, delete "RA" and insert -- (RA) --.

In Column 34, In Line 12, In Claim 18, delete "RLC" and insert -- (RLC) --.

In Column 34, In Line 13, In Claim 18, delete "ARQ" and insert -- (ARQ) --.

In Column 34, In Line 16, In Claim 18, delete "ARQ" and insert -- (ARQ) --.

Signed and Sealed this
Seventeenth Day of December, 2024

Derrick Brent
*Acting Director of the United States Patent and Trademark Office*